(12) United States Patent
Saffer

(10) Patent No.: US 7,689,414 B2
(45) Date of Patent: Mar. 30, 2010

(54) SPEECH RECOGNITION DEVICE AND METHOD

(75) Inventor: Zsolt Saffer, Vienna (AT)

(73) Assignee: Nuance Communications Austria GmbH, Vienna (AT)

( * ) Notice: Subject to any disclaimer, the term of this patent is extended or adjusted under 35 U.S.C. 154(b) by 768 days.

(21) Appl. No.: 10/535,295

(22) PCT Filed: Oct. 31, 2003

(86) PCT No.: PCT/IB03/04920

§ 371 (c)(1),
(2), (4) Date: May 17, 2005

(87) PCT Pub. No.: WO2004/049308

PCT Pub. Date: Jun. 10, 2004

(65) Prior Publication Data

US 2006/0074667 A1    Apr. 6, 2006

(30) Foreign Application Priority Data

Nov. 22, 2002    (EP) ................................. 02102626

(51) Int. Cl.
*G10L 15/00* (2006.01)
(52) U.S. Cl. .................. 704/231; 704/235; 704/246; 704/250
(58) Field of Classification Search .............. 704/231, 704/235, 254
See application file for complete search history.

(56) References Cited

U.S. PATENT DOCUMENTS

| | | | | |
|---|---|---|---|---|
| 5,054,084 A | * | 10/1991 | Tanaka et al. | ................ 704/254 |
| 6,061,646 A | * | 5/2000 | Martino et al. | ................. 704/3 |
| 6,377,913 B1 | * | 4/2002 | Coffman et al. | ................. 704/8 |
| 6,477,491 B1 | * | 11/2002 | Chandler et al. | ............ 704/235 |
| 7,143,033 B2 | * | 11/2006 | Belenger et al. | ............ 704/235 |
| 2002/0087306 A1 | * | 7/2002 | Lee et al. | ...................... 704/233 |
| 2002/0087311 A1 | | 7/2002 | Basir et al. | |
| 2002/0138272 A1 | | 9/2002 | Anderson et al. | |
| 2004/0059575 A1 | * | 3/2004 | Brookes et al. | ............. 704/254 |
| 2004/0236573 A1 | * | 11/2004 | Sapeluk | ....................... 704/224 |
| 2005/0038652 A1 | * | 2/2005 | Dobler | ........................ 704/251 |

FOREIGN PATENT DOCUMENTS

WO    WO9808215 A1    2/1998

* cited by examiner

*Primary Examiner*—Richemond Dorvil
*Assistant Examiner*—Douglas C Godbold
(74) *Attorney, Agent, or Firm*—Wolf, Greenfield & Sacks, P.C.

(57) ABSTRACT

In a speech recognition device (1) for recognizing text information (TI) corresponding to speech information (SI), wherein speech information (SI) can be characterized in respect of language properties, there are firstly provided at least two language-property recognition means (20, 21, 22, 23), each of the language-property recognition means (20, 21, 22, 23) being arranged, by using the speech information (SI), to recognize a language property assigned to said means and to generate property information (ASI, LI, SGI, CI) representing the language property that is recognized, and secondly there are provided speech recognition means (24) that, while continuously taking into account the at least two items of property information (ASI, LI, SGI, CI), are arranged to recognize the text information (TI) corresponding to the speech information (SI).

15 Claims, 11 Drawing Sheets

SPEECH RECOGNITION DEVICE AND METHOD

Figure 1:
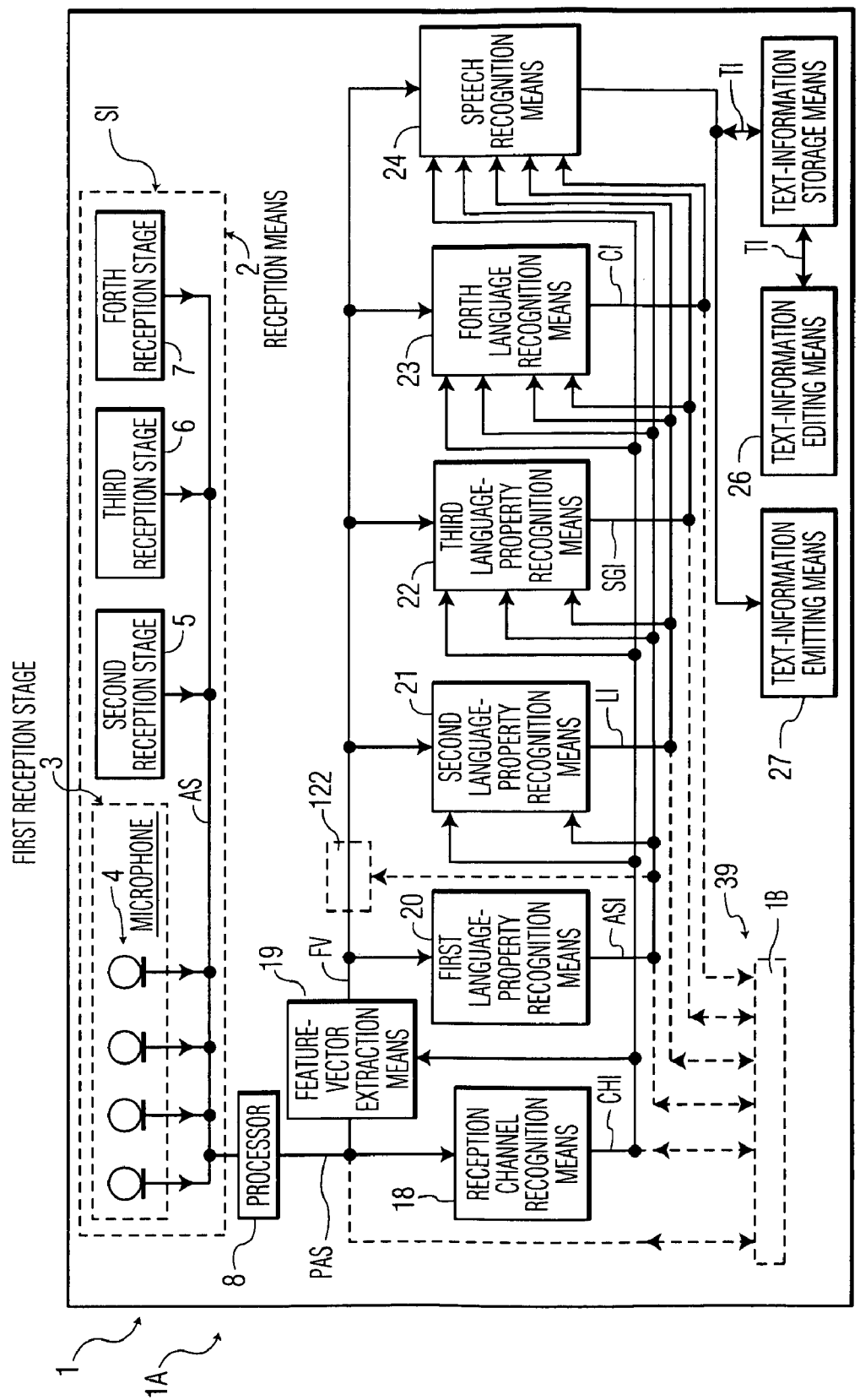

The invention relates to a speech recognition device for recognizing text information corresponding to speech information.

The invention further relates to a speech recognition method for recognizing text information corresponding to speech information.

The invention further relates to a computer program product that is arranged to recognize text information corresponding to speech information.

The invention further relates to a computer program product that runs the computer program product detailed in the previous paragraph.

A speech recognition device of the kind specified in the first paragraph above, a speech recognition method of the kind specified in the second paragraph above, a computer program product of the kind specified in the third paragraph above and a computer of the kind specified in the fourth paragraph above are known from patent WO 98/08215.

In the known speech recognition device, speech recognition means are provided to which speech information is fed via a microphone. The speech recognition means are arranged to recognize the text information in the speech information while continuously taking into account property information that represents the context to be used at the time for recognizing the text information. For the purpose of generating the property information, the speech recognition means has language-property recognition means that are arranged to receive a representation of the speech information from the speech recognition means and, by using this representation of the speech information, to recognize the context that exists at the time as a language property that characterizes the speech information and to generate the property information that represents the current context.

In the known speech recognition device, there is the problem that although provision is made for the recognition of a single language property that characterizes the speech information, namely for the recognition of the context that exists at the time, other language properties that characterize the speech information, such as speech segmentation, or the language being used at the time, or the speaker group that applies at the time, are not taken into account during the recognition of the text information. These language properties that are left out of account therefore need to be known beforehand before use is made of the known speech recognition device and, in the event that allowance can in fact be made for them, have to be preconfigured, which may mean they have to be preset to fix values, i.e. to be unalterable, which makes it impossible for the known speech recognition device to be used in an application where these language properties that cannot be taken into account change during operation, i.e. while the text information is being recognized.

It is an object of the invention to overcome the problem detailed above in a speech recognition device of the kind specified in the first paragraph above, in a speech recognition method of the kind specified in the second paragraph above, in a computer program product of the kind specified in the third paragraph above and in a computer of the kind specified in the fourth paragraph above, and to provide an improved speech recognition device, an improved speech recognition method, an improved computer program product and an improved computer.

To achieve the object stated above, features according to the invention are provided in a speech recognition device according to the invention, thus enabling a speech recognition device according to the invention to be characterized in the manner stated below, namely:

A speech recognition device for recognizing text information corresponding to speech information, which speech information can be characterized in respect of language properties, wherein first language-property recognition means are provided that, by using the speech information, are arranged to recognize a first language property and to generate first property information representing the first language property that is recognized, wherein at least second language-property recognition means are provided that, by using the speech information, are arranged to recognize a second language property of the speech information and to generate second property information representing the second language property that is recognized, and wherein speech recognition means are provided that are arranged to recognize the text information corresponding to the speech information while continuously taking into account at least the first property information and the second property information.

To achieve the object stated above, features according to the invention are provided in a speech recognition method according to the invention, thus enabling a speech recognition method according to the invention to be characterized in the manner stated below, namely:

A speech recognition method for recognizing text information corresponding to speech information, which speech information can be characterized in respect of language properties, wherein, by using the speech information, a first language property is recognized, wherein first property information representing the first language property that is recognized is generated, wherein at least one second language property is recognized by using the speech information, wherein second property information representing the second language property that is recognized is generated, and wherein the text information corresponding to the speech information is recognized while continuously taking into account at least the first property information and the second property information.

To achieve the object stated above, provision is made in a computer program product according to the invention for the computer program product to be able to be loaded directly into a memory of a computer and to comprise sections of software code, it being possible for the speech recognition method according to the invented device to be performed by the computer when the computer program product is run on the computer.

To achieve the object stated above, provision is made in a computer according to the invention for the computer to have a processing unit and an internal memory and to run the computer program product specified in the previous paragraph.

By the making of the provisions according to the invention, the advantage is obtained that reliable recognition of text information in speech information is ensured even when there are a plurality of language properties that alter during the recognition of the text information. This gives the further advantage that the accuracy of recognition is considerably improved because mis-recognition of the text information due to failure to take into account an alteration in a language property can be reliably avoided by the generation and taking into account of the at least two items of property information, as a result of the fact that any alteration in either of the language properties is immediately represented by an item of property information associated with this language property and can therefore be taken into account while the text information is being recognized. The further advantage is thereby obtained that, by virtue of the plurality of items of property information available, considerably more exact modeling of the language can be utilized to allow the text information to be recognized, which makes a positive contribution to the accuracy with which the language properties are recognized and consequently to the recognition of the text information too and, what is more, to the speed with which the text information is recognized as well. A further advantage is obtained in this way, namely that it becomes possible for the speech recognition device according to the invention to be used in an area of application that makes the most stringent demands on the flexibility with which the text information is recognized, such as for example in a conference transcription system for automatically transcribing speech information occurring during a conference. In this area of application, it is even possible to obtain recognition of the text information approximately in real time, even where the speech information that exists is produced by different speakers in different languages.

In the solutions according to the invention, it has also proved advantageous if, in addition, the features detailed in claim 2 and claim 7 respectively, are provided. This gives the advantage that the bandwidth of an audio signal that is used for the reception of the speech information, where the bandwidth of the audio signal is dependent on the particular reception channel, can be taken into account in the recognition of the property information and/or in the recognition of the text information.

In the solutions according to the invention, it has also proved advantageous if, in addition, the features detailed in claim 3 and claim 8 respectively, are provided. This gives the advantage that part of the speech information is only processed by the speech recognition means if valid property information exists for said part of the speech information, i.e. if the language properties have been determined for said part, thus enabling any unnecessary wastage or taking up of computing capacity, i.e. of so-called system resources, required for the recognition of text information to be reliably avoided.

In the solutions according to the invention, it has also proved advantageous if, in addition, the features detailed in claim 4 and claim 9 respectively, are provided. This gives the advantage that it becomes possible for the at least two language-property recognition means to influence one another. This gives the further advantage that it becomes possible for the individual language properties to be recognized sequentially in a sequence that is helpful for the recognition of the language properties, which makes a positive contribution to the speed and accuracy with which the text information is recognized and allows improved use to be made of the computing capacity.

In the solutions according to the invention, it has also proved advantageous if, in addition, the features detailed in claim 5 and claim 10 respectively, are provided. This gives the advantage that it becomes possible for the given language property to be recognized as a function of the other language property in as reliable a way as possible, because the other language property that can be used to recognize the given language property is only used if the property information that corresponds to the other language property, i.e. the language property that needs to be taken into account, is in fact available.

In a computer program product according to the invention, it has also proved advantageous if, in addition, the features detailed in claim 11 are provided. This gives the advantage that the computer program product can be marketed, sold or hired as easily as possible.

These and other aspects of the invention are apparent from and will be elucidated with reference to the embodiments described hereinafter, to which however it is not limited.

Figure 2:
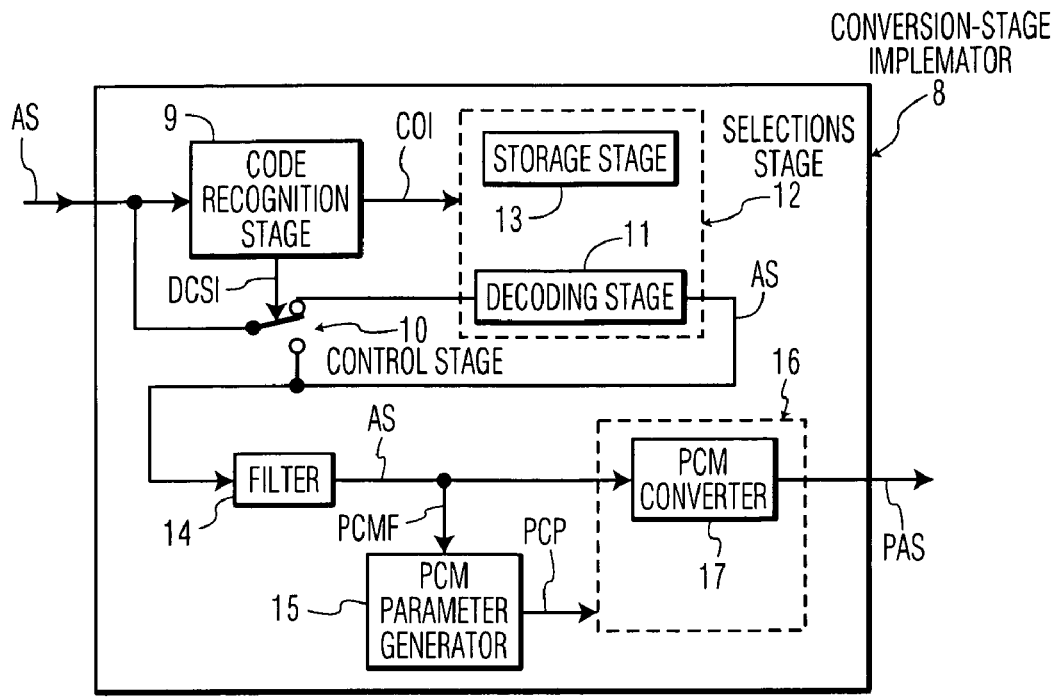
Figure 3:
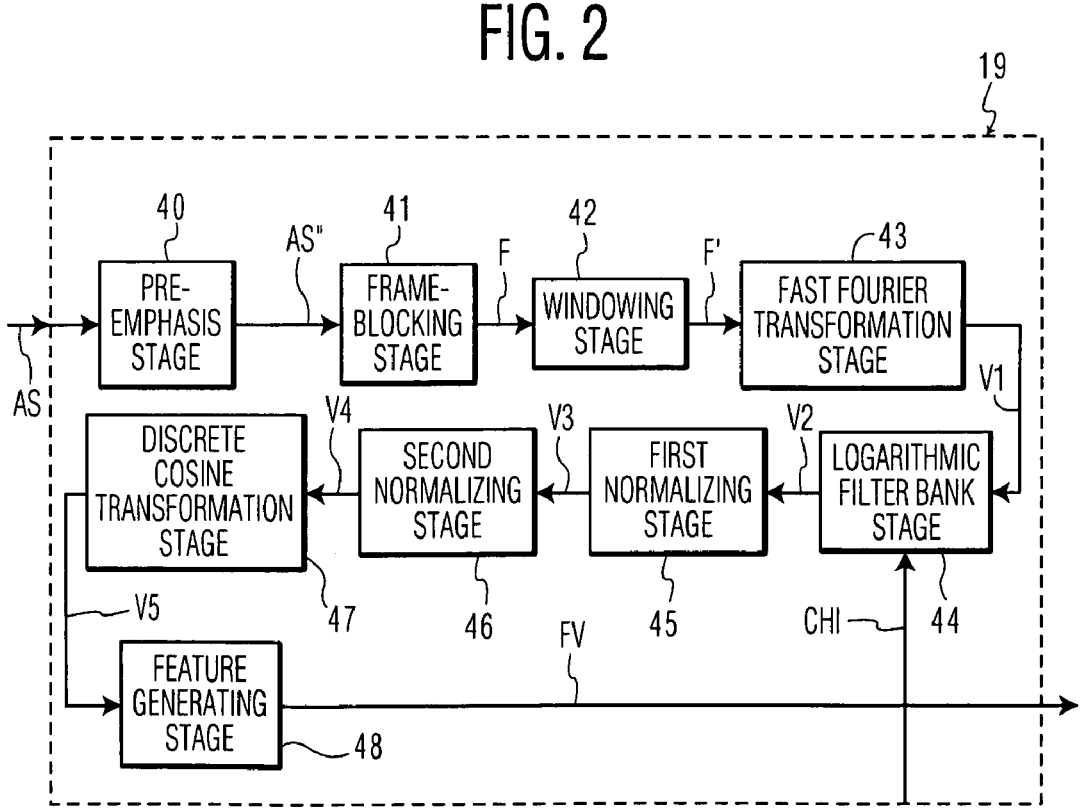
Figure 4:
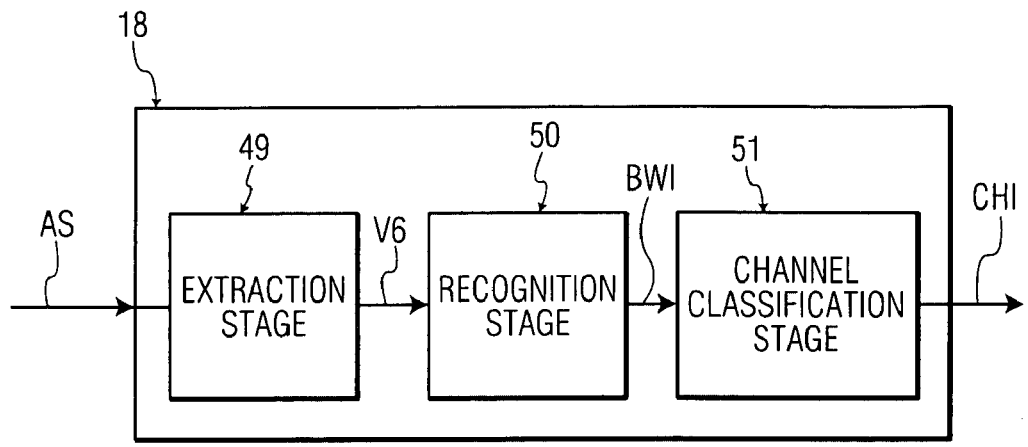
Figure 5:
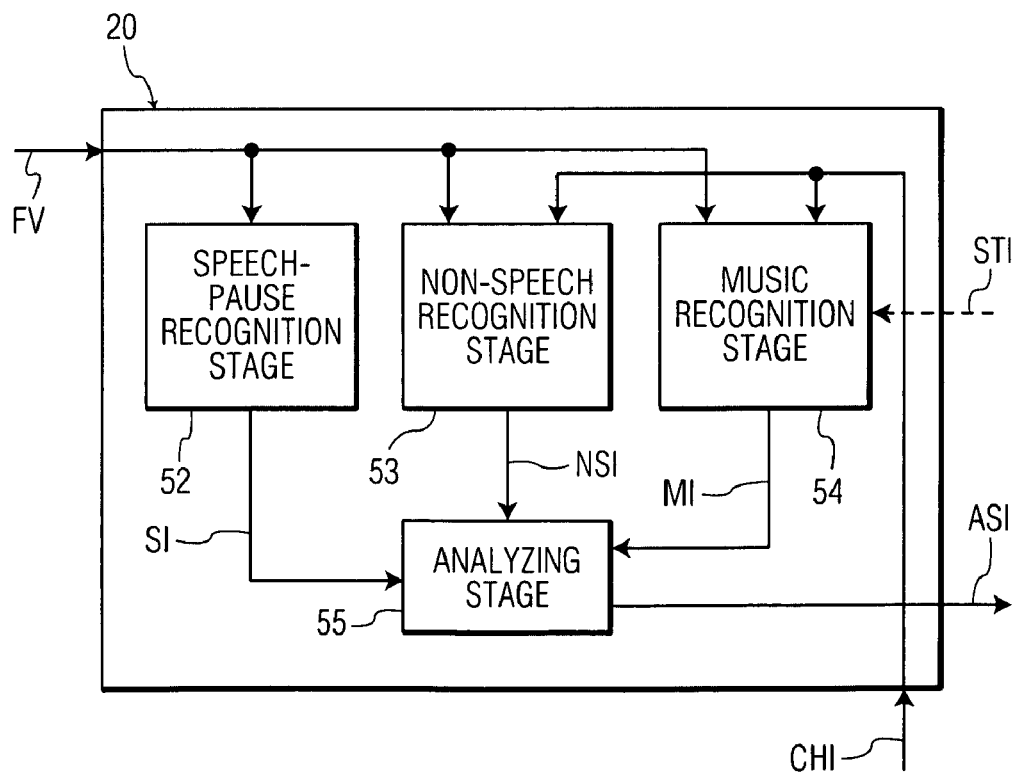
Figure 6:
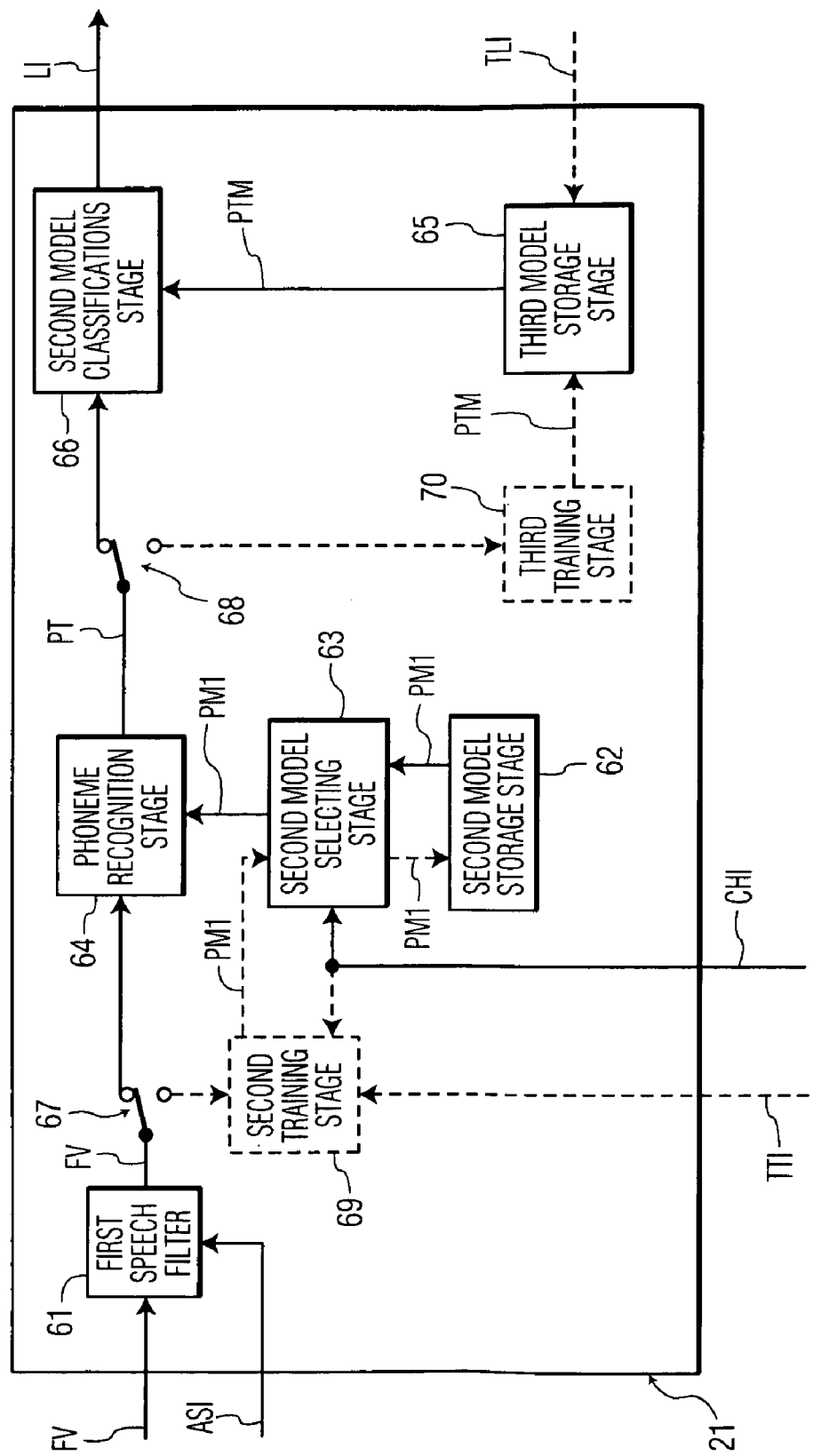
Figure 7:
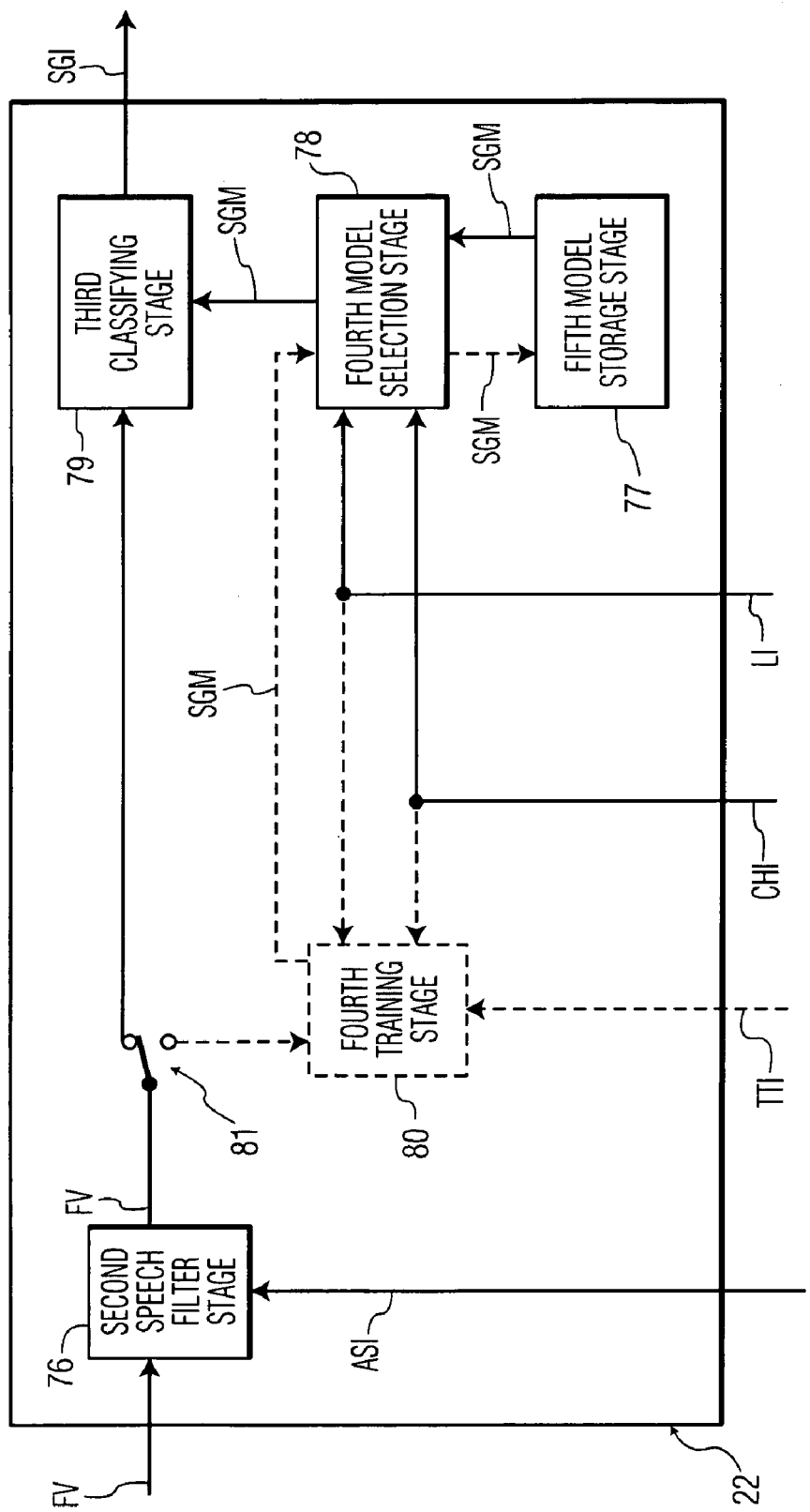
Figure 8:
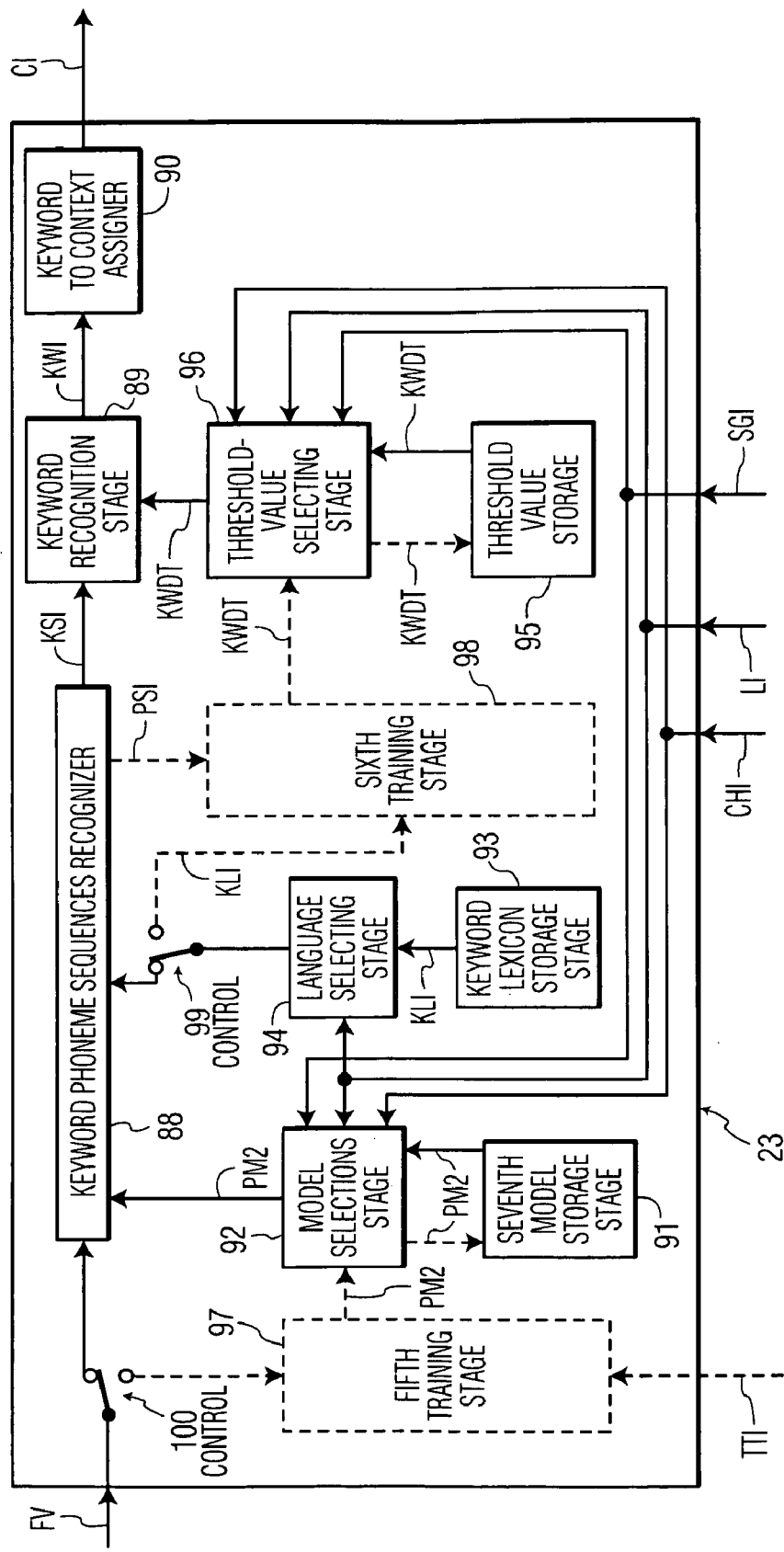
Figure 9:
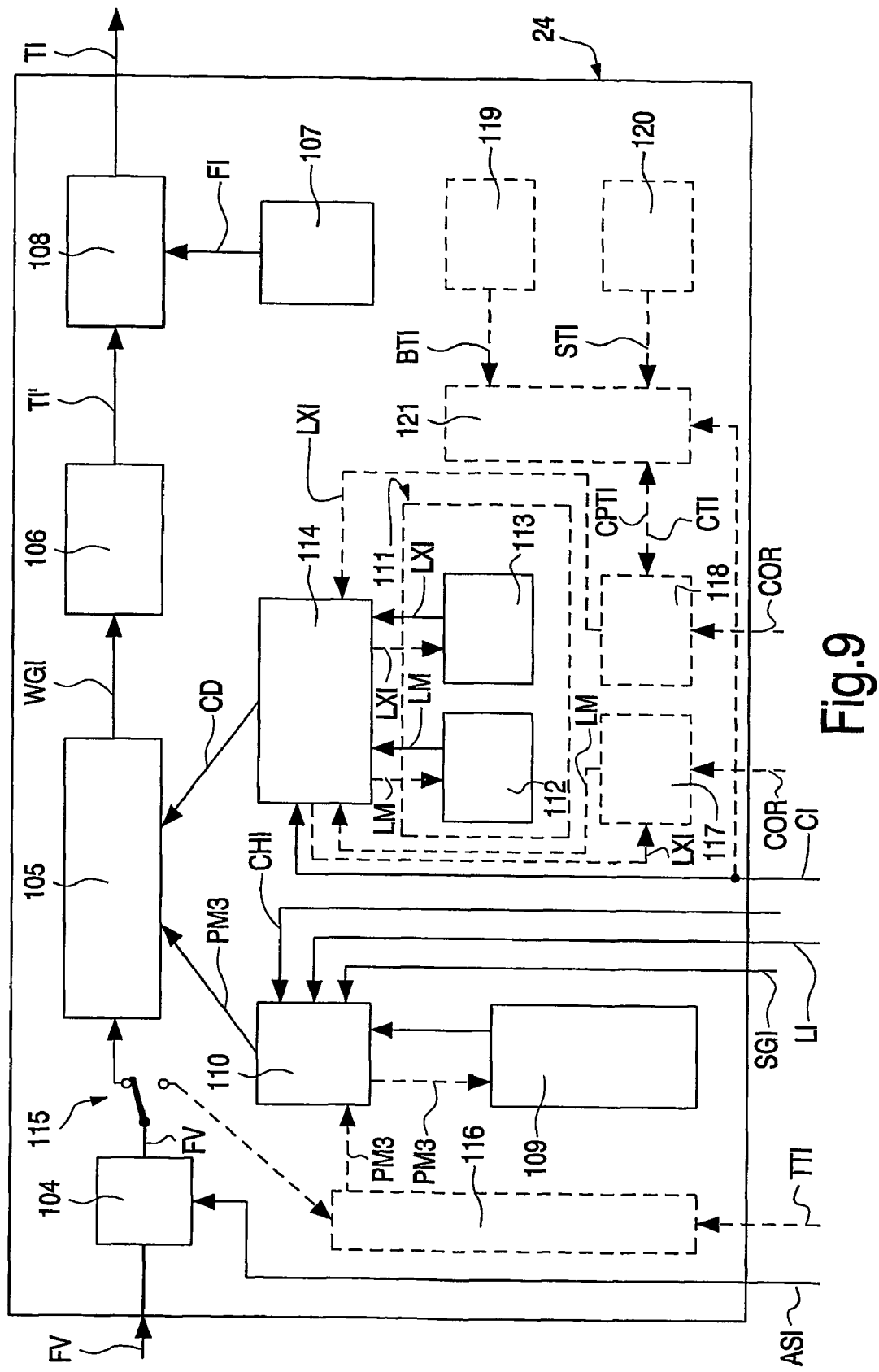
Figure 10:
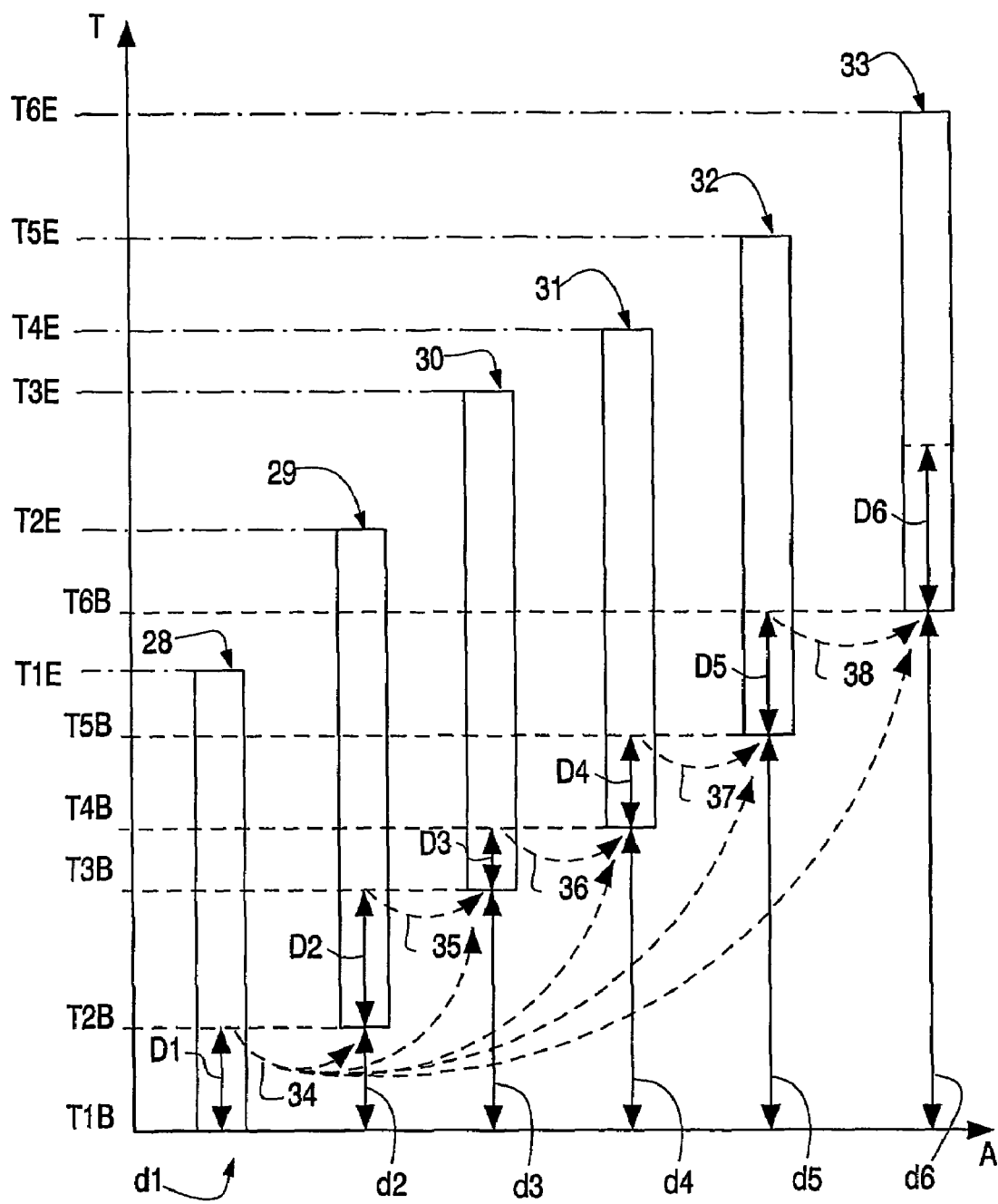
Figure 11:
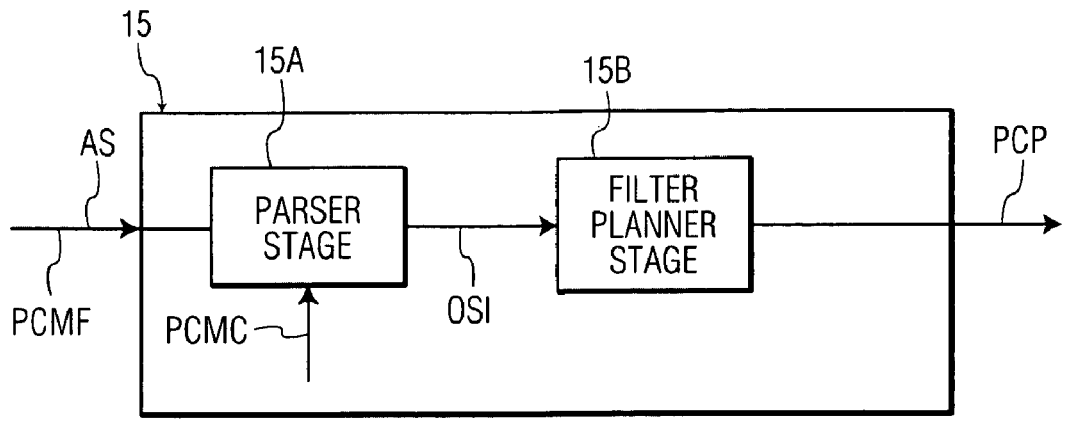
Figure 12:
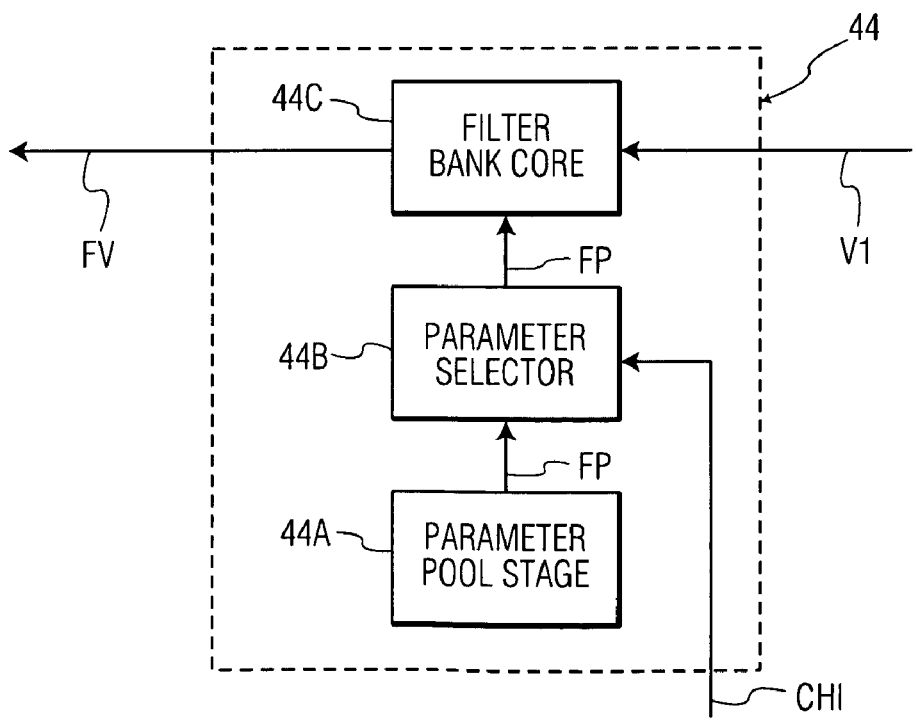
Figure 13:
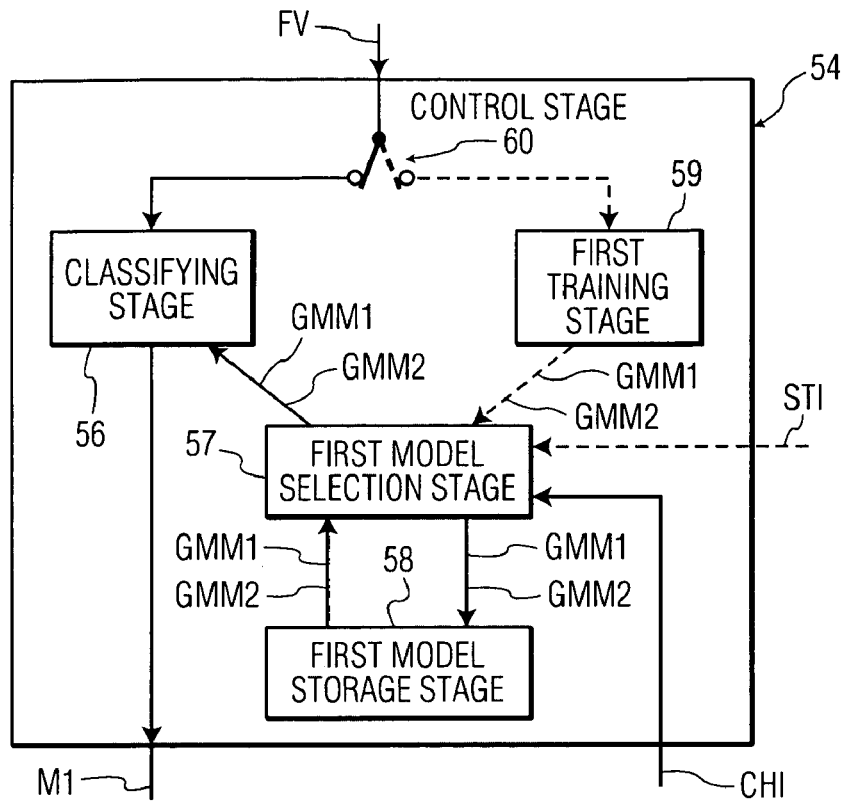
Figure 14:
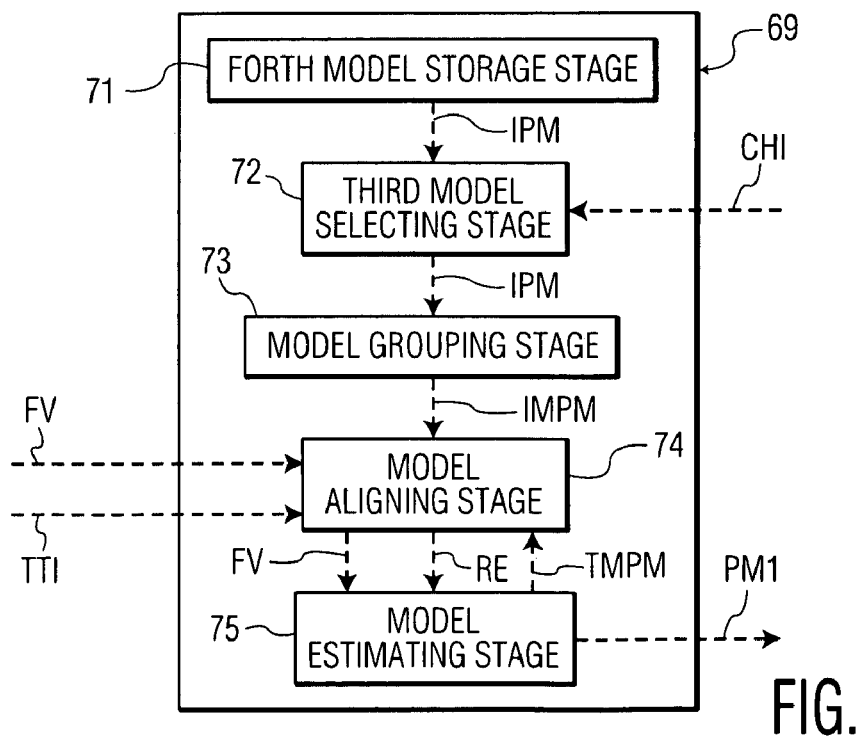
Figure 15:
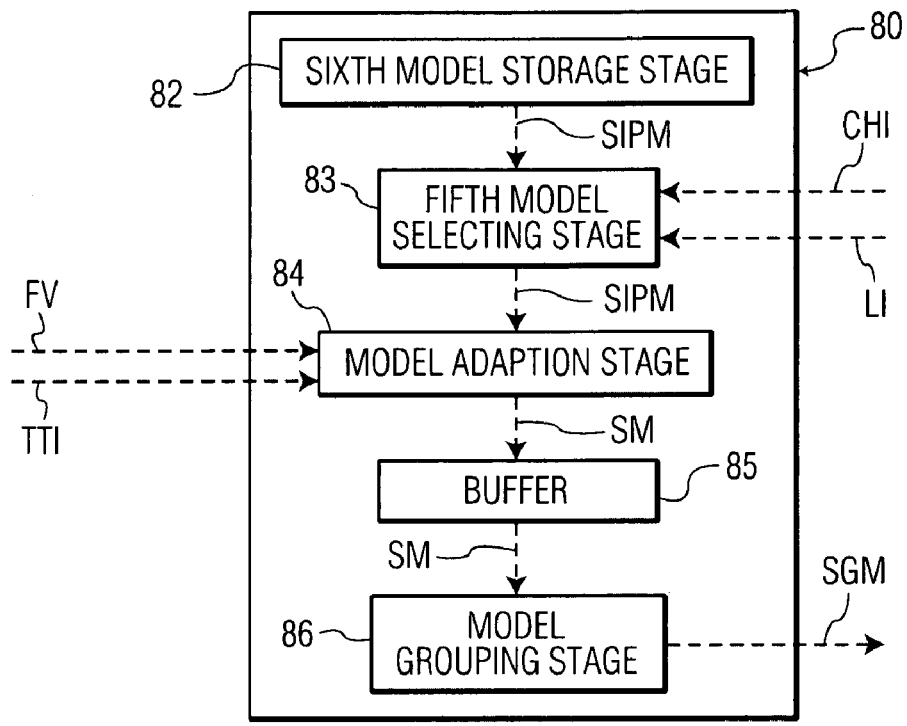
Figure 16:
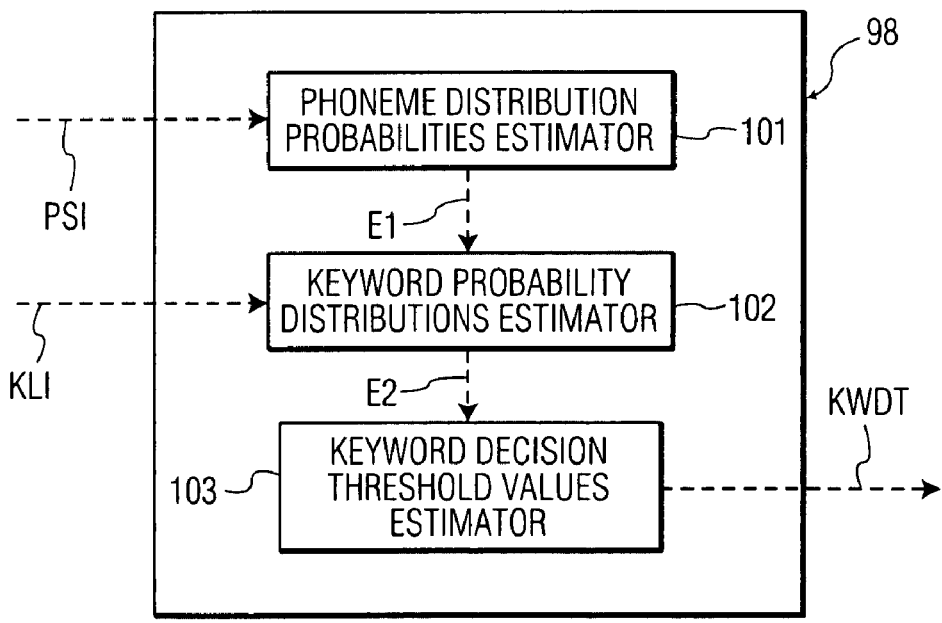

In the drawings:

FIG. 1 is a schematic view in the form of a block circuit diagram of a speech recognition device according to one embodiment of the invention, FIG. 2 shows, in a similar way to FIG. 1, audio preprocessor means of the speech recognition device shown in FIG. 1, FIG. 3 shows, in a similar way to FIG. 1, feature-vector extraction means of the speech recognition device shown in FIG. 1, FIG. 4 shows, in a similar way to FIG. 1, reception-channel recognition means of the speech recognition device shown in FIG. 1, FIG. 5 shows, in a similar way to FIG. 1, first language-property recognition means of the speech recognition device shown in FIG. 1, FIG. 6 shows, in a similar way to FIG. 1, second language-property recognition means of the speech recognition device shown in FIG. 1, FIG. 7 shows, in a similar way to FIG. 1, third language-property recognition means of the speech recognition device shown in FIG. 1, FIG. 8 shows, in a similar way to FIG. 1, fourth language-property recognition means of the speech recognition device shown in FIG. 1, FIG. 9 shows, in a similar way to FIG. 1, speech recognition means of the speech recognition device shown in FIG. 1, FIG. 10 shows, in a similar schematic way in the form of a bar-chart, a plot over time of the activities of a plurality of recognition means of the speech recognition device shown in FIG. 1, FIG. 11 shows, in a similar way to FIG. 1, a detail of the audio preprocessor means shown in FIG. 1, FIG. 12 shows, in a similar way to FIG. 1, a logarithmic filter bank stage of the feature-vector extraction means shown in FIG. 3, FIG. 13 shows, in a similar way to FIG. 1, a music recognition stage of the first language-property recognition means shown in FIG. 5, FIG. 14 shows, in a similar way to FIG. 1, a second training stage of the second language-property recognition means shown in FIG. 6, FIG. 15 shows, in a similar way to FIG. 1, a fourth training stage of the third language-property recognition means shown in FIG. 7, FIG. 16 shows, in a similar way to FIG. 1, a sixth training stage of the fourth language-property recognition means shown in FIG. 8.

Shown in FIG. 1 is a speech recognition device 1 that is arranged to recognize text information TI corresponding to speech information TI, and that forms a conference transcription device by means of which the speech information SI that occurs at a conference and is produced by conference participants when they speak can be transcribed into text information TI.

The speech recognition device 1 is implemented in the form of a computer 1A, of which only the functional assemblies relevant to the speech recognition device 1 are shown in FIG. 1. The computer 1A has a processing unit that is not shown in FIG. 1 and an internal memory 1B, although only the functions of the internal memory 1B that are relevant to the speech recognition device 1 will be considered in detail below in connection with FIG. 1. The speech recognition device 1 uses the internal memory 1B to recognize the text information 1B corresponding to the speech information S1.

The computer runs a computer program product that can be loaded directly into the memory 1B of the computer 1A and that has sections of software code.

The speech recognition device 1 has reception means 2 that are arranged to receive speech information SI and to generate and emit audio signals AS representing the speech information SI, an audio signal AS bandwidth that affects the recognition of the speech information SI being dependent on a reception channel or transmission channel that is used to receive the speech information SI. The reception means 2 have a first reception stage 3 that forms a first reception channel and by means of which the speech information SI can be received via a plurality of microphones 4, each microphone 4 being assigned to one of the conference participants present in a conference room, by whom the speech information SI can be generated. Associated with the microphones 4 is a so-called sound card (not shown in FIG. 1) belonging to the computer 1A, by means of which the analog audio signals AS can be converted into digital audio signals AS. The reception means 2 also have a second reception stage 5 that forms a second reception channel and by means of which the speech information SI can be received via a plurality of analog telephone lines. The reception means 2 also have a third reception stage 6 that forms a third reception channel and by means of which the speech information SI can be received via a plurality of ISDN telephone lines. The reception means 2 also have a fourth reception stage 7 that forms a fourth reception channel and by means of which the speech information SI can be received via a computer data network by means of a so-called "voice-over-IP" data stream. The reception means 2 are also arranged to emit a digital representation of the audio signal AS received, in the form of a data stream, the digital representation of the audio signal AS having audio-signal formatting corresponding to the given reception channel and the data stream having so-called audio blocks and so-called audio headers contained in the audio blocks, which audio headers specify the particular audio-signal formatting.

The speech recognition device 1 also has audio preprocessor means 8 that are arranged to receive the audio signal AS emitted by the reception means 2. The audio preprocessor means 8 are further arranged to convert the audio signal AS received into an audio signal PAS that is formatted in a standard format, namely a standard PCM format, and that is intended for further processing, and to emit the audio signal PAS. For this purpose, the audio preprocessor means 8 shown in FIG. 2 have a code recognition stage 9, a first data-stream control stage 10, a decoding stage 11, a decoding algorithm selecting stage 12, a decoding algorithm storage stage 13, and a high-pass filter stage 14. The audio signal AS received can be fed directly to the first data-stream control stage 10. The audio headers can be fed to the code recognition stage 9. By reference to the audio headers, the code recognition stage 9 is arranged to recognize a possible coding of the audio signal AS represented by the audio blocks and, when a coding is present, to transmit code recognition information COI to the decoding algorithm selecting stage 12. When a coding is present, the code recognition stage 9 is also arranged to transmit data-stream influencing information DCSI to the first data-stream control stage 10, to allow the audio signal AS fed to the first data-stream control stage 10 to be transmitted to the decoding stage 11. If the audio signal AS is not found to have a coding, the code recognition stage 9 can control the data-stream control stage 10, by means of the data-stream influencing information DCSI, in such a way that the audio signal AS can be transmitted direct from the data-stream control stage 10 to the high-pass filter stage 14.

The decoding algorithm storage stage 13 is arranged to store a plurality of decoding algorithms. The decoding algorithm selecting stage 12 is implemented in the form of a software object that, as a function of the code recognition information COI, is arranged to select one of the stored decoding algorithms and, by using the decoding algorithm selected, to implement the decoding stage 11. The decoding stage 11 is arranged to decode the audio signal AS as a function of the decoding algorithm selected and to transmit a code-free audio signal AS to the high-pass filter stage 14. The high-pass filter stage 14 is arranged to apply high-pass filtering to the audio signal AS, thus enabling interfering low-frequency components of the audio signal AS to be removed, which low-frequency components may have a disadvantageous effect on further processing of the audio signal AS.

The audio preprocessor means 8 also have a stage 15 for generating PCM format conversion parameters that is arranged to receive the high-pass filtered audio signal AS and to process PCM format information PCMF belonging to the high-pass filtered audio signal AS, the PCM format information PCMF being represented by the particular audio header. The stage 15 for generating PCM format conversion parameters is also arranged to generate and emit PCM format conversion parameters PCP, by using the PCM format information PCMF and definable PCM format configuring information PCMC (not shown in FIG. 2) that specifies the standard PCM format to be produced for the audio signal AS.

The audio preprocessor means 8 also have a conversion-stage implementing stage 16 that is in the form of a software object and that is arranged to receive and process the PCM format conversion parameters PCP and, by using these parameters PCP, to implement a PCM format conversion stage 17. The PCH format conversion stage 17 is arranged to receive the high-pass filtered audio signal AS and to convert it into the audio signal PAS and to emit the audio signal PAS from the audio preprocessor means 8. The PCM format conversion stage 17 has (not shown in FIG. 2) a plurality of conversion stages, which can be put into action as a function of the PCM format conversion parameters PCP, to implement the PMC format conversion stage 17.

The stage 15 for generating PCM format conversion parameters that is shown in detail in FIG. 11 has at the input end a parser stage 15A that, by using the PCM format configuring information PCMC and the PCM format information PCMF, is arranged to set the number of conversion stages at the format conversion stages 17 and the number of input/output PCM formats individually assigned to them, which is represented by object specifying information OSI that can be emitted by it. The PCM format information PCMF defines in this case an input audio signal format to the stage 15 for generating PCM format conversion parameters and the PCM format configuring information PCMC defines an output audio signal format from said stage 15. The stage 15 for generating PCM format conversion parameters also has a filter planner stage 15B that, by using the object specifying information OSI, is arranged to plan further properties for each of the conversion stages, which further properties and the object specifying information OSI are represented by the PCM format conversion parameters PCP that can be generated and emitted by said stage 15.

The speech recognition device 1 shown in FIG. 1 also has reception-channel recognition means 18 that are arranged to receive the audio signal PAS preprocessed by the audio preprocessor means 8, to recognize the reception channel being used at the time to receive the speech information SI, to generate channel information CHI representing the reception channel that is recognized and to emit this channel information CHI.

The speech recognition device 1 also has feature-vector extraction means 19 that are arranged to receive the audio signal PAS preprocessed by the audio preprocessor means 8 in the same way as the reception-channel recognition means 18, and also the channel information CHI and, while taking into account the channel information CHI, to generate and emit what are termed feature vectors FV, which will be considered in detail at a suitable point in connection with FIG. 3.

The speech recognition device 1 also has first language-property recognition means 20 that are arranged to receive the feature vectors FV representing the speech information SI and to receive the channel information CHI. The first language-property recognition means 20 are further arranged, by using the feature vectors FV and by continuously taking into account the channel information CHI, to recognize a first language property—namely an acoustic segmentation—and to generate and emit first property information that represents the acoustic segmentation recognized—namely segmentation information ASI.

The speech recognition device 1 also has second language-property recognition means 21 that are arranged to receive the feature vectors FV representing the speech information SI, to receive the channel-stated information CHI, and to receive the segmentation information ASI. The second language-property recognition means 21 are further arranged, by using the feature vectors FV and by continuously taking into account the channel information CHI and the segmentation information ASI, to recognize a second language property—namely what the language involved is, i.e. English, French or Spanish for example—and to generate and emit second property information that represents the language recognized, namely language information LI.

The speech recognition device 1 also has third language-property recognition means 22 that are arranged to receive the feature vectors FV representing the speech information SI, the channel information CHI, the segmentation information ASI and the language information LI. The third language-property recognition means 22 are further arranged, by using the feature vectors FV and by continuously taking into account the items of information CHI, ASI and LI, to recognize a third language property, namely a speaker group, and to generate and emit third property information that represents the speaker group recognized, namely speaker group information SGI.

The speech recognition device 1 also has fourth language-property recognition means 23 that are arranged to receive the feature vectors FV representing the speech information SI, and to receive the channel information CHI, the segmentation information ASI, the language information LI and the speaker group information SGI. The fourth language-property recognition means 23 are further arranged, by using the feature vectors FV and by continuously taking into account the items of information CHI, ASI, LI and SGI, to recognize a fourth language property, namely a context, and to generate and emit fourth property information that represents the context recognized, namely context information CI.

The speech recognition device 1 also has speech recognitions means 24 that, while continuously taking into account the channel information CHI, the first item of property information ASI, the second item of property information LI, the third item of property information SGI and the fourth item of property information CI, are arranged to recognize the text information TI by using the feature vectors FV representing the speech information SI and to emit the text information TI.

The speech recognition device 1 also has text-information storage means 25, text-information editing means 26 and text-information emitting means 27, the means 25 and 27 being arranged to receive the text information TI from the speech recognition means 24. The text-information storage means 25 are arranged to store the text information TI and to make the text information TI available for further processing by the means 26 and 27.

The text-information editing means 26 are arranged to access the text information TI stored in the text-information storage means 25 and to enable the text information TI that can be automatically generated by the speech recognition means 24 from the speech information SI to be edited. For this purpose, the text-information editing means 26 have display/input means (not shown in FIG. 1) that allow a user, such as a proof-reader for example, to edit the text information TI so that unclear points or errors that occur in the text information TI in the course of the automatic transcription, caused by a conference participant's unclear or incorrect enunciation or by problems in the transmission of the audio signal AS, can be corrected manually.

The text-information emitting means 27 are arranged to emit the text information TI that is stored in the text-information storage means 25 and, if required, has been edited by a user, the text-information emitting means 27 having interface means (not shown in FIG. 1) to transmit the text information TI in the form of a digital data stream to a computer network and to a display device.

In what follows, it will be explained how the recognition means 18, 20, 21, 22, 23 and 24 cooperate over time by reference to a plot of the activities of the recognition means 18, 20, 21, 22, 23 and 24 that is shown in FIG. 10. For this purpose, the individual activities are shown in FIG. 10 in the form of a bar-chart, where a first activity bar 28 represents the activity of the reception-channel recognition means 18, a second activity bar 29 represents the activity of the first language-property recognition means 20, a third activity bar 30 represents the activity of the second language-property recognition means 21, a fourth activity bar 31 represents the activity of the third language-property recognition means 22, a fifth activity bar 32 represents the activity of the fourth language-property recognition means 23, and a sixth activity bar 33 represents the activity of the speech recognition means 24.

The first activity bar 28 extends from a first begin point in time T1B to a first end point in time T1E. The second activity bar 29 extends from a second begin point in time T2B to a first end point in time T2E. The third activity bar 30 extends from a third begin point in time T3B to a third end point in time T3E. The fourth activity bar 31 extends from a fourth begin point in time T4B to a fourth end point in time T4E. The fifth activity bar 32 extends from a fifth begin point in time T5B to a fifth end point in time T5E. The sixth activity bar 33 extends from a sixth begin point in time T6B to a sixth end point in time T6E. During the activity of a given recognition means 18, 20, 21, 22, 23 or 24, the given recognition means completely processes the whole of the speech information SI, with each of the recognition means 18, 20, 21, 22, 23 or 24 beginning the processing of the speech information SI at the start of the speech information and at the particular begin point in time T1B, T2B, T3B, T4B, T5B or T6B assigned to it and completing the processing at the particular end point in time T1E, T2E, T3E, T4E, T5E or T6E assigned to it. There is usually virtually no difference between the overall processing time-spans that exist between the begin points in time T1B, T2B, T3B, T4B, T5B and T6B and the end points in time T1E, T2E, T3E, T4E, T5E and T6E. Differences may, however, occur in the individual overall processing time-spans if the respective processing speeds of the means 18, 20, 21, 22, 23 and 24 differ from one another, which for example has an effect if the speech information SI is made available off-line. What is meant by off-line in this case is for example that the speech information SI was previously recorded on a recording medium and this medium is subsequently made accessible to the speech recognition device 1.

Also shown in the chart are start delays d1 to d6 corresponding to the respective recognitions means 18, 20, 21, 22, 23 and 24, with d1=0 in the present case because the zero point on the time axis T has been selected to coincide in time with the first begin point in time T1B for the reception-channel recognition means 18. It should, however, be mentioned that the zero point in question can also be selected to be situated at some other point in time, thus making d1 unequal to zero.

Also entered in the chart are respective initial processing delays D1 to D6 corresponding to the recognition means 18, 20, 21, 22, 23 and 24, which delays D1 to D6 are caused by the particular recognition means 19, 20, 21, 22, 23 and 24 when they generate their respective items of information CHI, ASI, LI, SGI, CI and TI for the first time. Mathematically, the relationship between $d_i$ and $D_i$ can be summed up as follows, where, by definition, $d_0=0$ and $D_0=0$:

$$d_i = d_{i-1} + D_{i-1} \quad i = 1 \ldots 6 \text{ and, following from this:}$$

$$d_i = \sum_{i=0}^{i-1} D_i + d_0 \quad i = 1 \ldots 6.$$

At the first begin point in time T1B, the reception-channel recognition means 18 begin recognizing the reception channel 3, 5, 6 or 7 that is being used at the time to receive the speech information SI. The recognition of the given reception channel 3, 5, 6 or 7 takes place in this case, during a first initial processing delay D1, for a sub-area of a first part of the speech information SI, which first part can be transmitted during the processing delay D1 by the audio preprocessor means 8 to the reception-channel recognition means 18 in preprocessed form and which first part can be used during the processing delay D1 by the reception-channel recognition means 18 to allow the reception channel 3, 5, 6 or 7 being used to be recognized for the first time. In the present case the processing delay D1 is approximately one hundred (100) milliseconds and the first part of the speech information SI comprises approximately ten (10) so-called frames, with each frame representing the speech information SI for a period of approximately 10 milliseconds at the audio signal level. At the end of the processing delay D1, the reception-channel recognition means 18 generate for the first time the channel information CHI representing the reception channel 3, 5, 6 or 7 that has been recognized, for a first frame of the first part of the speech information SI, and transmit this channel information CHI to the four language-property recognition means 20 to 23 and to the speech recognitions means 24. This is indicated in the chart by the cluster of arrows 34.

As time continues to the end point in time TIE, the reception-channel recognition means 18 continuously generate or make channel information CHI, that is updated frame by frame, available for or to the four language-property recognition means 20 to 23 and the speech recognition means 24, thus enabling the channel information CHI to be continuously taken into account by the recognition means 20 to 24 frame by frame. In the course of this, and beginning with the second frame of the speech information SI, one further part of the speech information SI is processed at a time, which part contains a number of frames matched to the circumstances, and channel information CHI that applies to each first frame, i.e. to the first sub-area of the given part of the speech information SI, is generated or made available. Adjoining parts of the speech information SI, such as the first part and a second part, differ from one another in this case in that the second part has as a last frame a frame that is adjacent to the first part but is not contained in the first part, and in that the first frame of the second part is formed by a second frame of the first part that follows on from the first frame of the first part.

It should be mentioned at this point that, after it is generated for the first time, time-spans different than the first initial processing delay D1 may occur in the further, i.e. continuing, generation of the channel information CHI, as a function of the occurrence of the audio signal AS on one of the reception channels 3, 5, 6 and 7, and it may thus be possible for a different number of frames to be covered when generating the channel information CHI for the first frame of the given number of frames, i.e. for the first frames of the further parts of the speech information SI. It should also be mentioned at this point that adjoining parts of the speech information SI may also differ by more than two frames. Another point that should be mentioned is that the sub-area of a part of the speech information SI for which the channel information CHI is generated may also comprise various frames, in which case these various frames are preferably located at the beginning of a part of the speech information SI. Yet another point that should be mentioned is that this particular sub-area of a part of the speech information SI for which the channel information CHI is generated may also comprise the total number of frames contained in the part of the speech information SI, thus making the particular sub-area identical to the part. A final point that should be mentioned is that that particular sub-area of a part of the speech information SI for which the channel information CHI is generated need not necessarily be the first frame but could equally well be the second frame or any other frame of the part of the speech information SI. It is important for it to be understood in this case that a frame has precisely one single item of channel information CHI assigned to it.

In anticipation, it should be specified at this point that the statements made above regarding a part of the speech information SI and regarding that sub-area of the given part of the speech information SI for which the respective items of information ASI, LI, SGI, CI and TI are generated also apply to the means 20, 21, 22, 23, and 24.

Starting at point in time T2B, the first language-property recognition means 20 begin the recognition for the first time of the acoustic segmentation for the first frame, i.e. for the first sub-area of the first part of the speech information SI, doing so with a delay equal to the starting delay d2 and by using the feature vectors FV representing the first part of the speech information SI and while taking into account the channel information CHI that has been assigned in each case to each frame in the first part of the speech information SI. The starting delay d2 corresponds in this case to the initial processing delay D1 caused by the reception-channel recognition means 18. Hence the first language-property recognition means 20 are arranged to recognize the acoustic segmentation for the first frame for the first time with a delay of at least the time-span that is required by the reception-channel recognition means 18 to generate the channel information CHI for the first frame. The first language-property recognition means 20 also have a second initial processing delay D2 of their own, in which case the segmentation information ASI for the first frame of the first part of the speech information SI can be generated for the first time after this processing delay D2 has elapsed and can be transmitted to the recognition means 21 to 24, which is indicated by a single arrow 35 that takes the place of a further cluster of arrows that is not shown in FIG. 10.

Following the processing delay D2, updated segmentation information ASI is continuously generated or made available by the first language-property recognition means 20 for the further frames of the speech information SI that occur after its first frame, namely for each first frame of a respective part of the speech information SI, which they do while continuously taking into account the channel information CHI corresponding to each frame of the given part of the speech information SI.

Starting at point in time T3B, the second language-property recognition means 21 begin the recognition for the first time of the language for the first frame, i.e. for the first sub-area of the first part of the speech information SI, doing so with a delay equal to the starting delay d3 and by using the feature vectors FV representing the first part of the speech information SI and while taking into account the channel information CHI that has been assigned in each case to each frame in the first part of the speech information SI. The starting delay d3 corresponds in this case to the sum of the initial processing delays D1 and D2 caused by the reception-channel recognition means 18 and the first language-property recognition means 20. Hence the second language-property recognition means 21 are arranged to recognize the language for the first frame for the first time with a delay of at least the time-span that is required by the reception-channel recognition means 18 and the language-property recognition means 20 to generate the channel information CHI and the segmentation information ASI for the first frame for the first time. The second language-property recognition means 21 also have a third initial processing delay D3 of their own, in which case the language information LI for the first frame of the speech information SI can be generated for the first time after this processing delay D3 has elapsed and can be transmitted to the recognition means 22 to 24, which is indicated by a single arrow 36 that takes the place of a further cluster of arrows that is not shown in FIG. 10.

Following the processing delay D3, updated language information LI is continuously generated or made available by the second language-property recognition means 21 for the further frames of the speech information SI that occur after its first frame, namely for each first frame of the respective part of the speech information SI, which they do while continuously taking into account the items of information CHI and ASI corresponding to each frame of the given part of the speech information SI.

Starting at point in time T4B, the third language-property recognition means 22 begin the recognition for the first time of the speaker group for the first frame, i.e. for the first sub-area of the first part of the speech information SI, doing so with a delay equal to the starting delay d4 and by using the feature vectors FV representing the first part of the speech information SI and while taking into account the channel information CHI, segmentation information ASI and language information L1 that has been assigned in each case to each frame in the first part of the speech information SI. The starting delay d4 corresponds in this case to the sum of the initial processing delays D1, D2 and D3 caused by the reception-channel recognition means 18, the first language-property recognition means 21. Hence the third language-property recognition means 22 are arranged to recognize the speaker group for the first frame for the first time with a delay of at least the time-span that is required by the means 18, 20 and 21 to generate the channel information CHI, the segmentation information ASI and the language information LI for the first frame for the first time. The third language-property recognition means 22 also have a fourth initial processing delay D4 of their own, in which case the speaker group information SGI for the first frame can be generated for the first time after this processing delay D4 has elapsed and can be transmitted to the recognition means 23 and 24, which is indicated by a single arrow 37 that takes the place of a further cluster of arrows that is not shown in FIG. 10.

Following the processing delay D4, updated speaker group information SGI is continuously generated or made available by the third language-property recognition means 23 for the further frames of the speech information SI that occur after its first frame, namely for each first frame of the respective part of the speech information SI, which they do while continuously taking into account the items of information CHI, ASI and LI corresponding to each frame of the given part of the speech information SI.

Starting at point in time T5B, the fourth language-property recognition means 23 begin the recognition for the first time of the context for the first frame, i.e. for the first sub-area of the first part of the speech information SI, doing so with a delay equal to the starting delay d5 and by using the feature vectors FV representing the first part of the speech information SI and while taking into account the channel information CHI, segmentation information ASI, language information LI and speaker group information SGI that has been assigned in each case to each frame in the first part of the speech information SI. The starting delay d5 corresponds in this case to the sum of the initial processing delays D1, D2, D3 and D4 caused by the means 18, 20, 21 and 22. Hence the fourth language-property recognition means 23 are arranged to recognize the context for the first frame with a delay of at least the time-spans that are required by the means 18, 20, 21 and 22 to generate the items of information CHI, ASI, L1 and SGI for the first frame for the first time. The language-property recognition means 23 also have an fifth initial processing delay D5 of their own, in which case the context or topic information CI for the first frame of the speech information SI can be generated for the first time after this processing delay D5 has elapsed and can be transmitted to the speech recognition means 24, which is indicated by an arrow 38.

Following the processing delay D5, updated context or topic information CI is continuously generated or made available by the fourth language-property recognition means 23 for the further frames of the speech information SI that occur after its first frame, namely for each first frame of the respective part of the speech information SI, which they do while continuously taking into account the items of information CHI, ASI, LI, and SGI corresponding to each frame of the given part of the speech information SI.

Starting at point in time T6B, the speech recognition means 24 begin the recognition for the first time of the text information TI for the first frame, i.e. for the first sub-area of the first part of the speech information SI, doing so with a delay equal to the starting delay d6 and by using the feature vectors FV representing the first part of the speech information SI and while taking into account the channel information CHI, segmentation information ASI, language information L1, speaker group information SGI and context or topic information CI that has been assigned in each case to each frame in the first part of the speech information SI. The starting delay d6 corresponds in this case to the sum of the initial processing delays D1, D2, D3, D4 and D5 caused by the means 18, 20, 21, 22 and 23. Hence the recognition means 24 are arranged to recognize the text information TI for the first frame of the speech information SI for the first time with a delay of at least the time-spans that are required by the means 18, 20, 21, 22 and 23 to generate the items of information CHI, ASI, LI, SGI and CI for the first frame for the first time. The speech recognition means 24 also have an initial processing delay D6 of their own, in which case the text information TI for the first frame of the speech information SI can be generated for the first time after this processing delay D6 has elapsed and can be transmitted to the means 25, 26 and 27.

Following the processing delay D6, updated text information TI is continuously generated or made available by the speech recognition means 24 for the further frames of the speech information SI that occur after its first frame, namely for each first frame of the respective part of the speech information SI, which they do while continuously taken into account the items of information CHI, ASI, LI, SGI and CI corresponding to each frame of the given part of the speech information SI.

Summarizing it can be said in connection with the activities over time that a frame is processed by one of the recognition stages 20, 21, 22, 23 or 24 whenever all the items of information CHI, ASI, LI, SGI or CI required by the given recognition stage 20, 21, 22, 23 or 24 for processing the given frame are available at the given recognition stage 20, 21, 22, 23 or 24.

In the light of the above exposition, the speech recognition device 1 is arranged to perform a speech recognition method for recognizing text information TI corresponding to speech information SI, it being possible for the speech information SI to be characterized in respect of its language properties, namely the acoustic segmentation, the language, the speaker group and the context or topic. The speech recognition method has the method steps listed below, namely recognition of the acoustic segmentation by using the speech information SI, generation of segmentation information ASI representing the acoustic segmentation recognized, recognition of the language by using the speech information SI, generation of language information LI representing the language recognized, recognition of the speaker group by using the speech information SI, generation of speaker group information SGI representing the speaker group recognized, recognition of the context or topic by using the speech information SI, generation of context or topic information CI representing the context or topic recognized, and recognition of the text information TI corresponding to the speech information SI while taking continuous account of the segmentation information ASI, the language information LI, the speaker group information SGI and the context information CI, the generation of the items of information ASI, LI, SGI and CI, and in particular the way in which account is taken of the items of information CHI, ASI, LI and SGI that are required for this purpose in the respective cases, being considered in detail below.

What is also done in the speech recognition method is that the speech information SI is received and, by using the audio signal AS that is characteristic of one of the four reception channels 3, 5, 6, and 7, the reception channel being used at the time to receive the speech information SI is recognized, an item of channel information CHI which represents the reception channel recognized 3, 5, 6 or 7 is generated, and the channel information CHI is taken into account in the recognition of the acoustic segmentation, the language, the speaker group, the context and the text information TI, the recognition of the reception channel 3, 5, 6 or 7 taking place continuously, that is to say frame by frame, for, in each case, the first frame of the given part of the speech information SI, and, correspondingly thereto, the channel information being continuously updated, i.e. regenerated, and being taken into account continuously too.

What also occurs in the speech recognition method is that the recognition of the acoustic segmentation is performed while taking into account the channel information CHI corresponding to each frame of the respective part of the speech information SI. The recognition of the acoustic segmentation for the first frame of the given part of the speech information SI takes place in this case with a delay of at least the time-span required for the generation of the channel information CHI, during which time-span the given part of the speech information SI can be used to generate the channel information CHI for the first frame of the given part. A further delay is produced by the second processing delay D2 caused by the first language-property recognition means 20. Following this, the acoustic segmentation is updated frame by frame.

What also occurs in the speech recognition method is that the recognition of the language is performed while taking into account, in addition, the segmentation information ASI corresponding to each frame of the given part of the speech information SI. The recognition of the language for the first frame of the given part of the speech information SI takes place in this case with a delay of at least the time-spans required for the generation of the channel information CHI and the segmentation information ASI, during which time-spans the given part of the speech information SI can be used to generate the two items of information CHI and ASI for the first frame of the given part. A further delay is produced by the third processing delay D3 caused by the second language-property recognition means 21. Following this, the language is updated frame by frame.

What also occurs in the speech recognition method is that the recognition of the speaker group is performed while taking into account, in addition, the segmentation information ASI and language information LI corresponding to each frame of the given part of the speech information SI. The recognition of the speaker group for the first frame of the given part of the speech information SI takes place in this case with a delay of at least the time-spans required for the generation of the channel information CHI, the segmentation information ASI and the language information LI, during which time-spans the given part of the speech information SI can be used to generate the items of information CHI, ASI and LI for the first frame of the given part. A further delay is produced by the fourth processing delay D4 caused by the third language-property recognition means 22. Following this, the speaker group is updated frame by frame.

What also occurs in the speech recognition method is that the recognition of the context or topic is performed while taking into account, in addition, the segmentation information ASI, language information LI and speaker group information SGI corresponding to each frame of the given part of the speech information SI. The recognition of the context or topic for the first frame of the given part of the speech information SI takes place in this case with a delay of at least the time-spans required for the generation of the CHI, ASI, LI and SGI information, during which time-spans the given part of the speech information SI can be used to generate the items of information CHI, ASI, LI and SGI for the sub-area of the given part. A further delay is produced by the fifth processing delay D5 caused by the fourth language-property recognition means 23. Following this, the context or topic is updated frame by frame.

What also occurs in the speech recognition method is that, while taking into account the CHI, ASI, LI, SGI and CI information corresponding to each frame of the given part of the speech information SI, the recognition of the text information TI corresponding to the speech information TI is performed for the first frame of the given part of the speech information SI with a delay of at least the time-spans required for the generation of the channel information CHI, the segmentation information ASI, the language information LI, the speaker group information ASI and the context or topic information CI, during which time-spans the given part of the speech information SI can be used to generate the items of information CHI, ASI, LI, SGI and CI for the first frame of the given part. A further delay is produced by the sixth processing delay D6 caused by the speech recognition means 24. Following this, the text information TI is updated frame by frame.

The speech recognition method is performed with the computer 1A when the computer program product is run on the computer 1A. The computer program product is stored on a computer-readable medium that is not shown in FIG. 1, which medium is formed in the present case by a compact disk (CD). It should be mentioned at this point that a DVD, a tape-like data carrier or a hard disk may be provided as the medium. In the present case the computer has as its processing unit a single microprocessor. It should however be mentioned that, for reasons of performance, a plurality of microprocessors may also be provided, such for example as a dedicated microprocessor for each of the recognition means 18, 20, 21, 22, 23 and 24. The internal memory 1B of the computer 1A is formed in the present case by a combination of a hard disk (not shown in FIG. 1) and working memory 39 formed by what are termed RAM's, which means that the computer program product can first be stored onto the hard disk from the computer-readable medium and can be loaded into the working memory 39 for running by means of the processing unit, as will be sufficiently familiar to the man skilled in the art. The memory 1B is also arranged to store the preprocessed audio signal PAS and the items of information CHI, ASI, LI, SGI and CI and to store items of temporal correlation data (not shown in FIG. 1). The items of temporal correlation data represent a temporal correlation between the sub-areas of the speech information SI and the items of information CHI, ASI, LI, SGI and CI that respectively, correspond to these sub-areas, to enable the acoustic segmentation, the language, the speaker group, the context or topic and the text information TI for the given sub-area of the speech information SI to be recognized with the correct temporal synchronization.

What is achieved in an advantageous way by the provision of the features according to the invention is that the speech recognition device 1 or the speech recognition method can be used for the first time in an application in which a plurality of language properties characteristic of the speech information SI are simultaneously subject to a change occurring substantially at random points in time. An application of this kind exists in the case of, for example, a conference transcription system, where speech information SI produced by random conference participants has to be converted into text information TI continuously and approximately in real time, in which case the conference participants, in a conference room, supply the speech information SI to the speech recognition device 1 via the first reception channel 3 by means of the audio signal AS. The conference participants may use different languages in this case and may belong to different individual speaker groups. Also, circumstances may occur during a conference, such as background noise for example, which affect the acoustic segmentation. Also, the context or topic being used at the time may change during the conference. What also becomes possible in an advantageous way is for conference participants who are not present in the conference room also to supply the speech information SI associated with them to the speech recognition device 1, via further reception channels 5, 6 and 7. Even in this case, there is an assurance in the case of the speech recognition device 1 that the text information TI will be reliably recognized, because the reception channel 3, 5, 6 or 7 being used in the given case is recognized and continuous account is taken of it in the recognition of the language properties, i.e. in the generation and updating of the items of information CHI, ASI, LI, SCI and CI.

An application of this kind also exists when, at a call center for example, a record is to be kept of calls by random persons, who may be using different languages.

An application of this kind also exists when, in the case of an automatic telephone information service for example, callers of any desired kinds are to be served. It should be expressly made clear at this point that the applications that have been cited here do not represent a full and complete enumeration.

The feature-vector extraction means 19 shown in FIG. 3 have a pre-emphasis stage 40 that is arranged to receive the audio signal AS and to emit a modified audio signal AS" representing the audio signal AS, higher frequencies being emphasized in the modified audio signal AS" to level out the frequency response. Also provided is a frame-blocking stage 41 that is arranged to receive the modified audio signal AS" and to emit parts of the modified audio signal AS" that are embedded in frames F. The adjacent frames F of the audio signal AS" have a temporal overlap in their edge regions in this case. Also provided is a windowing stage 42 that is arranged to receive the frames F and to generate modified frames F' representing the frames F, which modified frames F' are limited in respect of the bandwidth of the audio signal represented by the frames F, to avoid unwanted effects at a subsequent conversion to the spectral level. A so-called Hemming window is used in the windowing stage in the present case. It should however be mentioned that other types of window may be used as well. Also provided is a fast Fourier transformation stage 43 that is arranged to receive the modified frames F' and to generate vectors V1 on the spectral level corresponding to the bandwidth-limited audio signal AS" contained in the modified frames F', a so-called "zero-padding" method being used in the present case. Also provided is a logarithmic filter bank stage 44 that is arranged to receive the first vectors V1 and the channel information CHI and, using the first vectors V1 and while taking into account the channel information CHI, to generate and emit second vectors V2, the second vectors V2 representing a logarithmic mapping of intermediate vectors that can be generated from the first vectors V1 by a filter bank method.

The logarithmic filter bank stage 44 that is shown in FIG. 12 has a filter-bank parameter pool stage 44A that stores a pool of filter-bank parameters. Also provided is a filter parameter selecting stage 44B that is arranged to receive the channel information CHI and to select filter-bank parameters FP corresponding to the channel information CHI. Also provided is what is termed a logarithmic filter-bank core 44C that is arranged to process the first vectors V1 and to generate the second vectors V2 as a function of the filter-bank parameters FP receivable from the filter parameter selecting stage 44B.

The feature-vector extraction means 19 shown in FIG. 3 also have a first normalizing stage 45 that is arranged to receive the second vectors V2 and to generate and emit third vectors V3 that are free of means in respect of the amplitude of the second vectors V2. This ensures that further processing is possible irrespective of the particular reception channel involved. Also provided is a second normalizing stage 46 that is arranged to receive the third vectors V3 and, while taking into account the temporal variance applicable to each of the components of the third vectors V3, to generate fourth vectors V4 that are normalized in respect of the temporal variance of the third vectors V3. Also provided is a discrete cosine transformation stage 47 that is arranged to receive the fourth vectors V4 and to convert the fourth vectors V4 to the so-called "cepstral" level and to emit fifth vectors V5 that correspond to the fourth vectors V4. Also provided is a feature-vector generating stage 48 that is arranged to receive the fifth vectors V5 and to generate the first and second time derivatives of the fifth vectors V5, which means that the vector representation of the audio signal AS in the form of the feature vectors FV, which representation can be emitted by the feature-vector generating stage 48, has the fifth vectors V5 on the "cepstral" level and the time derivatives corresponding thereto.

The reception-channel recognition means 18 shown in FIG. 4 have at the input end a spectral-vector extraction stage 49 that is arranged to receive the audio signal AS and to extract and emit spectral vectors V6, which spectral vectors V6 represent the audio signal AS on the spectral level. The reception-channel recognition means 18 further have a bandwidth-limitation recognition stage 50 that is arranged to receive the spectral vectors V6 and, by using the spectral vectors V6, to recognize a limitation of the frequency band of the audio signal AS, the bandwidth limitation found in the particular case being representative of one of the four reception channels. The bandwidth-limitation recognition stage 50 is also arranged to emit an item of bandwidth-limitation information BWI that represents the bandwidth limitation recognized. The reception-channel recognition means 18 further have a channel classifying stage 51 that is arranged to receive the bandwidth-limitation information BWI and, by using this information BWI, to classify the reception channel that is current at the time and to generate the channel information CHI corresponding thereto.

The first language-property recognition means 20 shown in FIG. 5 have a speech-pause recognition stage 52, a non-speech recognition stage 53 and a music recognition stage 53, to each of which recognition stages 52, 53 and 54 the feature vectors can be fed. The speech-pause recognition stage 52 is arranged to recognize feature vectors FV representing pauses in speech and to emit an item of speech-pause information SI representing the result of the recognition. The non-speech recognition stage 53 is arranged to receive the channel information CHI and, while taking the channel information CHI into account, to recognize feature vectors FV representing non-speech and to emit an item of non-speech information NSI representing non-speech. The music recognition stage 54 is arranged to receive the channel information CHI and, while taking the channel information CHI into account, to recognize feature vectors FV representing music and to generate an emit an item of music information MI representing the recognition of music. The first language-property recognition means 20 further have an information analyzing stage 55 that is arranged to receive the speech-pause information SI, the non-speech information NSI and the music information MI. The information analyzing stage 55 is further arranged to analyze the items of information SI, NSI and MI and, as a result of the analysis, to generate and emit the segmentation information ASI, the segmentation information ASI stating whether the frame of the audio signal AS that is represented at the time by the feature vectors FV is associated with a pause in speech or non-speech or music, and, if the given frame is not associated either with a pause in speech, or with non-speech or with music, stating that the given frame is associated with speech.

The music recognition stage 54 that is shown in detail in FIG. 13 is arranged to recognize music in a trainable manner and for this purpose is arranged to receive segmentation training information STI. The music recognition stage 54 has a classifying stage 56 that, with the help of two groups of so-called "Gaussian mixture models" is arranged to classify the feature vectors FV into feature vectors FV representing music and feature-vectors FV representing non-music. Each first Gaussian mixture model GMM1 belonging to the first group is assigned to a music classification and each second Gaussian mixture model GMM2 belonging to the second group is assigned to a non-music classification. The classifying stage 56 is also arranged to emit the music information MI as a result of the classification. The music recognition stage 54 further has a first model selecting stage 57 and a first model storage stage 58. For each of the reception channels, the first model storage stage 58 is arranged to store a Gaussian mixture model GMM1 assigned to the music classification and a Gaussian mixture model GMM2 assigned to the non-music classification. The first model selecting stage 57 is arranged to receive the channel information CHI and, with the help of the channel information CHI, to select a pair of Gaussian mixture models GMM1 and GMM2 which correspond to the reception channel stated in the given case, and to transmit the Gaussian mixture models GMM1 and GMM2 selected in this channel-specific manner to the classifying stage 56.

The music recognition stage 54 is further arranged to train the Gaussian mixture models, and for this purpose it has a first training stage 59 and a first data-stream control stage 60. In the course of the training, feature vectors FV that, in a predetermined way, each belong to a single class, namely music or non-music, can be fed to the first training stage 59 with the help of the data-stream control stage 60. The training stage 59 is also arranged to train the channel-specific pairs of Gaussian mixture models GMM1 and GMM2. The first model selecting stage 57 is arranged to transmit the Gaussian mixture models GMM1 and GMM2 to the storage locations intended for them in the first model storage stage 58, with the help of the channel information CHI and the segmentation training information STI.

The second language-property recognition means 21 shown in FIG. 6 have at the input end a first speech filter stage 61 that is arranged to receive the feature vectors FV and the segmentation information ASI and, by using the feature vectors FV and the segmentation information ASI, to filter out feature vectors FV representing speech and to emit the feature vectors FV representing speech. The second language-property recognition means 21 further have a second model storage stage 62 that is arranged and intended to store a multilanguage first phoneme model PM1 for each of the four reception channels. The recognition means 21 further have a second model selecting stage 63 that is arranged to receive the channel information CHI and, by using the channel information CHI, to access, in the second model storage stage 62, the multilanguage phoneme model PM1 that corresponds to the reception channel stated by the channel information CHI and to emit the channel-specific multi-language phoneme model PM1 that has been selected in this way. The recognition means 21 further have a phoneme recognition stage 64 that is arranged to receive the feature vectors FV representing speech and the phoneme model PM1 and, by using the feature vectors FV and the phoneme model PM1, to generate and emit a phonetic transcription PT of the language represented by the feature vectors FV. The recognition means 21 further have a third model storage stage 65 that is arranged and intended to store a phonotactic model PTM for each language. The recognition means 21 further have a second classifying stage 66 that is arranged to access the third model storage stage 65 and, with the help of the phonotactic model PTM, to classify the phonetic transcription PT phonotactically, the probability of a language being present being determinable for each available language. The second classifying stage 66 is arranged to generate and emit the language information LI as a result of the determination of the probability corresponding to each language, the language information LI giving the language for which the probability found was the highest.

The recognition means 21 can also be acted on in a trainable way in respect of the recognition of language and for this purpose have a second data-stream control stage 67, a third data-stream control stage 68, a second training stage 69 and a third training stage 70. In the event of training, the feature vectors FV representing speech can be fed to the second training stage 69 with the help of the second data-stream control stage 67. The second training stage 69 is arranged to receive these feature vectors FV, to receive training text information TTI and to receive the channel information CHI, in which case a phonetic transcription made from the training text information TTI corresponds to the language represented by the feature vectors FV. Hence, by using the feature vectors FV and the training text information TTI, the second training stage 69 is arranged to train the phoneme model PM1 and to transmit the trained phoneme model PM1 to the model selecting stage 63. The model selecting stage 63 is further arranged, with the help of the channel information CHI, to transmit the trained phoneme model PM1 to the second model storage stage 62, where it can be stored at a storage location in said second model storage stage 62 that corresponds to the channel information CHI.

In the event of training, the phonetic transcription PT able to be made by the phoneme recognition stage 64 can also be fed to the third training stage 70 with the help of the third data-stream control stage 68. The third training stage 70 is arranged to receive the phonetic transcription PT, to train a phonotactic model PTM assigned to the given training language information TLI and to transmit it to the third model storage stage 65. The third model storage stage 65 is arranged to store the phonotactic model PTM belonging to a language at a storage location corresponding to the training language information TLI. It should be mentioned at this point that the models PM1 and PM2 stored in the second model storage stage 62 and the third model storage stage 65 are referred to in the specialist jargon as trainable resources.

The second training stage 69 is shown in detail in FIG. 14 and has a fourth model storage stage 71, a third model selecting stage 72, a model grouping stage 73, a model aligning stage 74 and a model estimating stage 75. The fourth model storage stage 71 is arranged and intended to store a channel-specific and language-specific initial phoneme model IPM for each channel and each language. The third model selecting stage 72 is arranged to access the fourth model storage stage 71 and to receive the channel information CHI and, by using the channel information CHI, to read out the initial phoneme model IPM corresponding to the channel information CHI, for all languages. The third model selecting stage 72 is further arranged to transmit a plurality of language-specific phoneme models IPM corresponding to the given channel to the model grouping stage 73. The model grouping stage 73 is arranged to group together language-specific phoneme models IPM that are similar to one another and belong to different languages and to generate an initial multi-language phoneme model IMPM and to transmit it to the model aligning stage 74. The model aligning stage 74 is arranged to receive the feature vectors FV representing speech and the training text information TTI corresponding thereto and, with the help of the initial multi-language phoneme model IMPM, to generate items of alignment information RE that are intended to align the feature vectors FV with sections of text represented by the training text information TTI, the items of alignment information RE also being referred to in the specialist jargon as "paths". The items of alignment information RE and the feature vectors FV can be transmitted to the model estimating stage 75 by the model aligning stage 74. The model estimating stage 75 is arranged, by using the items of alignment information RE and the feature vectors FV, to generate the multi-language phoneme model PM1 based on the initial multi-language phoneme model IMPM and to transmit it to the second model storage stage 62 shown in FIG. 7. For this purpose and using the feature vectors FV and the alignment information RE, a temporary multi-language phoneme model TMPM is generated and transmitted to the model estimating stage 74, the multi-language phoneme model PM1 being generated in a plurality of iterative stages, i.e. by repeated co-operation of the stages 74 and 75.

The third language-property recognition means 22 shown in FIG. 7 have at the input end a second speech filter stage 76 that is arranged to receive the feature vectors FV and the segmentation information ASI and, by using the segmentation information ASI, to filter out and emit feature vectors FV representing speech. The recognition means 22 also have a fifth model storage stage 77 that is arranged and intended to store speaker group models SGM for each channel and each language. The recognition means 22 further have a fourth model selecting stage 78 that is arranged to receive the channel information CHI and the language information LI and, by using the channel information CHI and the language information LI, to access the given speaker group model SGM that corresponds to the given channel information CHI and the given language information LI. The fourth model selecting stage 78 is also arranged to transmit the speaker group model SGM that can be read out as a result of the access to the fifth model storage stage 77. The recognition means 22 further have a third classifying stage 79 that is arranged to receive the speaker group model SGM selected as a function of items of information CHI and LI by the fourth model selecting stage 78 and to receive the feature vectors FV representing speech and, with the help of the speaker group model SGM selected, to classify the speaker group to which the feature vectors FV can be assigned. The third classifying stage 79 is further arranged to generate and emit the speaker group information SGI as a result of the classification.

By means of the fifth model storage stage 77, a further trainable resource is implemented, the speaker group models SGM stored therein being alterable in a trainable manner. For this purpose, the recognition means 22 have a fourth training stage 80 and a fourth data-stream control stage 81. In the event of training, feature vectors FV representing the language can be fed to the fourth training stage 80 with the help of the fourth data-stream control stage 81. For a number of speakers, the fourth training stage 80 is arranged to receive feature vectors FV assigned to respective ones of the speakers and the training text information TTI corresponding to each of the feature vectors FV, to train the given speaker group model SGM and to transmit the given trained speaker group model SGM to the fourth model selecting stage 78.

The fourth training stage 80 that is shown in detail in FIG. 15 has a sixth model storage stage 82, a fifth model selecting stage 83, a model adaption stage 84, a buffer storage stage 85 and a model grouping stage 86. The sixth model storage stage 82 is arranged and intended to store speaker-independent phoneme models SIPM for each channel and each language.

The fifth model selecting stage 83 is arranged to receive the channel information CHI and the language information LI and, by using these two items of information CHI and LI, to access the sixth model storage stage 82, or rather the initial speaker-independent phoneme model SIPM corresponding to the given items of information CHI and LI, and to emit the speaker-independent phoneme model SIPM that has been selected and is now channel-specific and language-specific.

The model adaption stage 84 is arranged to receive the initial speaker-independent phoneme model SIPM that was selected in accordance with the channel information CHI and the language information LI and is thus channel-specific and language-specific, feature vectors FV representing the language, and the training text information TTI corresponding to these latter. For a plurality of speakers whose speech information SI is represented by the feature vectors FV, the model adaption stage 84 is further arranged to generate one speaker model SM each and to transmit it to the buffer storage stage 85, in which the given speaker model SM is storable. The speaker model SM is generated on the basis of the speaker-independent phoneme model SIPM by using an adaption process. Once the speaker models SM have been stored for the entire number of speakers, a grouping together of the plurality of speaker models into individual speaker group models SGM can be performed by means of the model grouping stage 86 in the light of similar speaker properties. The individual speaker group models SGM can be transmitted to the model selecting stage 78 and can be stored by the model selecting stage 78 in the model storage stage 77 by using the items of information CHI and LI.

The fourth language-property recognition means 23 that are shown in FIG. 8 have a stage 88 for recognizing keyword phoneme sequences, a keyword recognition stage 89 and a stage 90 for assigning keywords to a context or topic. The stage 88 is arranged to receive the feature vectors FV, to receive a second phoneme model PM2 that is channel-specific, language-specific and speaker-group-specific, and to receive keyword lexicon information KLI. The stage 88 is further arranged, by using the second phoneme model PM2 and the keyword lexicon information KLI, to recognize a keyword sequence represented by the feature vectors FV and to generate and emit keyword rating information KSI that represents a keyword that has been recognized and the probability with which it was recognized. The keyword recognition stage 89 is arranged to receive the keyword rating information KSI and to receive a keyword decision threshold value KWDT that is dependent on the reception channel, the language, the speaker group and the keyword. The stage 89 is further arranged, with the help of the keyword decision threshold value KWDT, to recognize which of the keywords received by means of the keyword rating information KSI were recognized. The keyword recognition stage 89 is arranged to generate keyword information KWI as a result of this recognition and to transmit said keyword information KWI to the stage 90 for assigning keywords to a context or topic. The stage 90 for assigning keywords to a topic is arranged to assign the keyword received with the help of the keyword information KWI to a context, which is often also referred to in the specialist jargon as a topic. The stage 90 for assigning keywords to a context or topic is arranged to generate the context information CI as a result of this assignment. The fourth language-property recognition means 23 further have a seventh model storage stage 91 that is arranged and intended to store the second phoneme model PM2 for each reception channel, each language and each speaker group. The recognition means 23 further have a sixth model selecting stage 92 that is arranged to receive the channel information CHI, the language information LI and the speaker group information SGI. The sixth model selecting stage 92 is further arranged, with the help of the channel information CHI, the language information LI and the speaker group information SGI, to select a second phoneme model PM2 stored in the seventh model storage stage 91 and to transmit the second phoneme model PM2 selected to the stage 88 for recognizing keyword phoneme sequences.

The recognition means 23 further have a keyword lexicon storage stage 93 and a language selecting stage 94. The keyword lexicon storage stage 93 is arranged and intended to store keywords for every language available. The language selecting stage 94 is arranged to receive the language information LI and to access the keyword lexicon storage stage 93, in which case, with the help of the language information LI, keyword lexicon information KLI that corresponds to the language information LI and represents the keywords in a language, can be transmitted to the stage 88 for recognizing keyword phoneme sequences. The recognition means 23 further have a threshold-value storage stage 95 that is arranged and intended to store keyword decision threshold values KWDT that depend on the given reception channel, the language, the speaker group and the keyword. The recognition means 23 further have a threshold-value selecting stage 96 that is arranged to receive the channel information CHI, the language information LI and the speaker group information SGI. The threshold-value selecting stage 96 is further arranged to access the keyword decision threshold values KWDT, corresponding to the items of information CHI, LI and SGI, that are stored in the threshold-value storage stage 95. The threshold-value selecting stage 96 is further arranged to transmit the keyword decision threshold value KWDT that has been selected in this way to the keyword recognition stage 89.

The recognition means 23 are further arranged to recognize the context or topic information CI in a trainable manner, two trainable resources being formed by the seventh model storage stage 91 and the threshold-value storage stage 95. The recognition means 23 further have a fifth training stage 97, a sixth training stage 98, a fifth data-stream control stage 99 and a sixth data-stream control stage 100. When the recognition means 23 are to be trained, the feature vectors FV can be fed to the fifth training stage 97 by means of the sixth data-stream control stage 100. The fifth training stage 97 is further arranged to receive the feature vectors FV and the training text information TTI corresponding thereto and, with the help of a so-called Viterbi algorithm, to generate one of the second phoneme models PM2 and transmit it to the sixth model selecting stage 92, as a result of which the second phoneme models PM2 are generated for each channel, each language and each speaker group. By means of the model selecting stage 92, the second phoneme models PM2 can be stored in the model storage stage 91 at storage locations that are determinable with the help of the items of information CHI, LI and SGI. By means of the fifth data-stream control stage 99, the keyword lexicon information KLI can also be fed to the sixth training stage 98. In a training process, the stage 88 for recognizing keyword phoneme sequences is arranged to recognize a phoneme sequence in feature vectors FV that represent the language, and to generate an item of phoneme rating information PSI representing the phoneme sequence that has been recognized and to transmit it to the sixth training stage 98, the phoneme rating information PSI representing the phonemes that have been recognized and, for each of them, the probability with which it was recognized.

The sixth training stage 98 is arranged to receive the phoneme rating information PSI and the keyword lexicon information KLI and, by using these two items of information PSI and KLI, to generate, i.e. to train, a keyword decision threshold value KWDT corresponding to the items of information CHI, LI and SGI and to transmit it to the threshold-value selecting stage 96. The threshold-value selecting stage 96 is arranged, by using the items of information CHI, LI and SGI, to transmit the keyword decision threshold value KWDT to the threshold value storage means 95. By means of the threshold value selecting stage 96, the keyword decision threshold value KWDT can be stored at a storage location determined by means of the items of information CHI, LI and SGI.

The sixth training stage 98 shown in detail in FIG. 16 has a stage 101 for estimating phoneme distribution probabilities that is arranged to receive the phoneme rating information psi and to estimate a statistical distribution for the phonemes spoken and the phonemes not spoken, on the assumption that a Gaussian distribution applies in each case. Stage 101 is thus arranged to generate and emit a first item of estimating information El as a result of this estimating process. The sixth training stage 98 further has a stage 102 for estimating keyword probability distributions that is arranged to receive the first item of estimating information El and the keyword lexicon information KLI. Stage 102 is further arranged, by using the two items of information KLI and EI, to estimate a statistical distribution for the keywords spoken and the keywords not spoken. Stage 102 is further arranged to generate and emit a second item of estimating information E2 as a result of this estimating process. The sixth training stage 98 further has a stage 103 for estimating keyword decision threshold values that, by using the second item of estimating information E2, is arranged to estimate the particular keyword decision threshold value KWDT and to emit the keyword decision threshold value KWDT as a result of this estimating process.

The speech recognition means 24 shown in detail in FIG. 9 have at the input end a third speech filter stage 104 that is arranged to receive the feature vectors FV and to receive the segmentation information ASI and, by using the segmentation information ASI, to filter the filter vectors FV received and to emit feature vectors FV representing speech.

The recognition means 24 further have a speech pattern recognition stage 105 that is arranged to receive the filter vectors FV representing speech, to receive a third phoneme model PM3 and to receive context or topic data CD. The speech pattern recognition stage 105 is further arranged, by using the third phoneme model PM3 and the context data CD, to recognize a pattern in the feature vectors FV that represent speech and, as a result of recognizing a pattern of this kind, to generate and emit word graph information WGI. The word graph information WGI represents graphs of words or word sequences and their associated items of probability information that state the probability with which it is possible for the words or word sequences to occur in the particular language spoken.

The recognition means 24 further have a graph rating stage 106 that is arranged to receive the word graph information WGI and to find which path in the graph has the best word sequence in respect of the recognition of the text information TI. The graph rating stage 106 is further arranged to emit reformatted text information TI' corresponding to the best word sequence as a result of the finding of this best word sequence.

The recognition means 24 further have a formatting storage stage 107 and a formatting stage 108. The formatting storage stage 107 is arranged to store formatting information FI, by means of which rules can be represented that state how the reformatted text information TI' is to be formatted. The formatting stage 108 is arranged to receive the reformatted text information TI' and to access the formatting storage stage 107 and read out the formatting information FI. The formatting stage 108 is further arranged, by using the formatting information FI, to format the reformatted text information TI' and to generate and emit the text information TI as a result of the formatting.

The recognition means 24 further have a seventh model storage stage 109 that is arranged and intended to store a third phoneme model PM3 for each reception channel, each language and each speaker group. Also provided is a seventh model selecting stage 110 that is arranged to receive the channel information CHI, the language information LI and the speaker group information SGI. The seventh model selecting stage 110 is further arranged, by using the items of information CHI, LI and SGI, to access the third phoneme model PM3 corresponding to these items of information CHI, LI and SGI in the seventh model storage stage 109 and to read out this channel-specific, language-specific and speaker-group-specific third phoneme model PM3 to the speech pattern recognition stage 105. The recognition means 24 further have a context or topic storage stage 111. The context or topic storage stage 111 is intended to store the context or topic data CD, which context data CD represents lexicon information LXI, and a language model LM corresponding to the lexicon information LXI, for each item of context or topic information CI and each language. The context storage stage 111 has a lexicon storage area 113 in which the particular lexicon information LXI can be stored, which lexicon information LXI comprises words and phoneme transcriptions of the words. The context or topic storage stage 111 has a language model storage stage 112 in which a language model LM corresponding to the given lexicon information LXI can be stored. The recognition means 24 further have a context or topic selecting stage 114 that is arranged to receive the context or topic information CI.

It should be mentioned at this point that the language information is not explicitly fed to the context selecting stage 114 because the context information implicitly represents the language.

The context or topic selecting stage 114 is further arranged, by using the context or topic information CI and the information on the given language implicitly represented thereby, to access the language model LM that, in the context storage stage 111, corresponds to the given context or topic information CI, and the lexicon information LXI, and to transmit the selected language model LM and the selected lexicon information LXI in the form of the context data CD to the speech pattern recognition stage 105.

The speech recognition means 24 are further arranged to generate the third phoneme model PM3, the lexicon information LX1 and each language model LM corresponding to a set of lexicon information LXI, in a trainable manner. In this connection, the seventh model storage stage 109 and the context storage stage 111 form trainable resources of the recognition means 24.

For the purpose of training the trainable resources, the recognition means 24 have a seventh data-stream control stage 115 and a seventh training stage 116. In the event of training, the seventh data-stream control stage 115 is arranged to transmit the feature vectors FV representing speech not to the speech pattern recognition stage 105 but to the seventh training stage 116. The seventh training stage 116 is arranged to receive the feature vectors FV representing speech and the training text information TTI corresponding thereto. The seventh training stage 116 is further arranged, by using the feature vectors FV and the training text information TTI and with the help of a Viterbi algorithm, to generate the given third phoneme model PM3 and transmit it to the seventh model selecting stage 110, thus enabling the third, trained phoneme model PM3, which corresponds to the channel information CHI, the language information LI or the speaker group information SGI, as the case may be, to be stored with the help of the seventh model selecting stage 110 in the seventh model storage stage 109 at a storage location defined by the items of information CHI, SGI and LI.

The recognition means 24 further have a language model training stage 117 that is arranged to receive a relatively large training text, which is referred to in the specialist jargon as a corpus and is represented by corpus information COR. The language model training stage 117 is arranged, by using the corpus information COR and with the help of the topic stated by information CI and the lexicon information LXI determined by the language implicitly stated by the information CI, to train or generate the language model LM corresponding to each item of context or topic information CI and the language implicitly represented thereby, the lexicon information LXI determined in this way being able to be read out from the lexicon storage stage 113 with the help of the context selecting stage 114 and to be transmitted to the language model training stage 117. The language model training stage 117 is arranged to transmit the trained language models LM to the context selecting stage 114, after which the language model LM is stored by means of the context selecting stage 114 and by using the information CI it stored at the storage location in the speech model storage area 112 that is intended for it.

The recognition means 24 further have a lexicon generating stage 118 that is likewise arranged to receive the corpus information COR and, by using the corpus information COR, to generate lexicon information LXI corresponding to each item of context information and to the language implicitly represented thereby and to transmit it to the context selecting stage 114, after which the lexicon information LXI is stored, with the help of the context selecting stage 114 and by using the information CI, at the storage location in the speech model storage area 112 that is intended for it. For the purpose of generating the lexicon information LXI, the recognition means 24 have a background lexicon storage stage 119 that is arranged to store a background lexicon, which background lexicon contains a basic stock of words and associated phonetic transcriptions of words that, as represented by background transcription information BTI, can be emitted. The recognition means 24 further have a statistical transcription stage 120 that, on the basis of a statistical transcription process, is arranged to generate a phonetic transcription of words contained in the corpus that can be emitted in a form in which it is represented by statistical transcription information STI.

The recognition means 24 further have a phonetic transcription stage 121 that is arranged to receive each individual word in the corpus text information CTI containing the corpus and, by taking account of the context or topic information CI and the information on the language implicitly contained therein, to make available for and transmit to the lexicon generating stage 118 a phonetic transcription of each word of the corpus text information CTI in the form of corpus phonetic transcription information CPTI. For this purpose the phonetic transcription stage 121 is arranged to check whether a suitable phonetic transcription is available for the given word in the background lexicon storage stage 119. If one is, the information BTI forms the information CPTI. If a suitable transcription is not available, then the phonetic transcription stage 121 is arranged to make available the information STI representing the given word to form the information CTI.

It should be mentioned at this point that the third phoneme model PM3 is also referred to as acoustic references, which means that the trainable resources comprise the acoustic references and the context or topic.

It should also be mentioned at this point that a so-called training lexicon is employed at each of the stages 69, 80, 97 and 116, by means of which a phonetic transcription required for the given training operation is generated from the training text or corpus information TTI.

In the speech recognition means 24, the items of information ASI, LI, SGI and CI that can be generated in a multi-stage fashion and each represent a language property produce essentially three effects. A first effect is that the filtering of the feature vectors FV is controlled by means of the segmentation information ASI at the third speech filter stage 104. This gives the advantage that the recognition of the text information TI can be performed accurately and swiftly, and autonomously and regardless of any prior way in which the feature vectors FV representing the speech information SI may have been affected, by background noise for example. A second effect is that, with the help of the channel information CHI, the language information LI and the speaker group information SGI, the selection of an acoustic reference corresponding to these items of information is controlled at the resources. This gives the advantage that a considerable contribution is made to the accurate recognition of the text information TI because the acoustic reference models the acoustic language property of the language with great accuracy. A third effect is that the selection of a context or topic is controlled at the resources with the help of the context or topic information. This gives the advantage that a further positive contribution is made to the accurate and swift recognition of the text information TI. With regard to accurate recognition, the advantage is obtained because a selectable topic models the actual topic that exists in the case of a language far more accurately than would be the case if there were a relatively wide topic that was rigidly preset. With regard to swift recognition, the advantage is obtained because the particular vocabulary corresponding to one of the items of context or topic information CI covers only some of the words in a language and can therefore be relatively small and hence able to be processed at a correspondingly high speed.

In the present case it has proved advantageous for the recognition stages 21, 22 and 24 each to have a speech filter stage 61, 76 and 104 of their own. Because of its function, the recognition stage 23 implicitly contains speech filtering facilities. It should be mentioned that in place of the three speech filter stages 61, 76 and 104 there may also be provided a single speech filter stage 122 as shown in FIG. 1 that is connected upstream of the recognition stages 21, 22, 23 and 24, which does not however have any adverse effect on the operation of recognition stage 23. This would give the advantage that the three speech filter stages 61, 76 and 104 would become unnecessary and, under certain circumstances, the processing of the feature vectors FV could therefore be performed more quickly as well.

It should be mentioned that, in place of the feature-vector extraction means 19 connected upstream of the means 20 to 24, each of the means 20 to 24 may have an individual feature-vector extraction means assigned to it, to which the preprocessed audio signal PAS can be fed. This makes it possible for each of the individual feature-vector extraction means to be optimally and individually adapted to the operation of its respective means 20 to 24. This gives the advantage that the vector representation of the preprocessed audio signal PAS can also take place in an individually adapted manner on a level other than the cepstral level.

It should be mentioned that the speech information SI may also be made available to the speech recognition device 1 by means of a storage medium or with the help of a computer network.

It should be mentioned that the stage 12 may also be implemented by hardware.

It should be mentioned that the conversion-stage implementing stage 16 may also be implemented as a hardware solution.

It should be mentioned that the sub-areas of the audio signal PAS and the items of information CHI, ASI, LI, SGI and CI corresponding thereto may also be stored in the form of so-called software objects and that the recognition means 18, 20, 21, 22, 23 and 24 may be arranged to generate, alter and process such software objects. Provision may also be made for it to be possible for the storage of the sub-areas of the audio signal PAS and the storage or management of the items of information CHI, ASI, LI, SGI and CI respectively, associated with them to be carried out independently by the means 18, 20, 21, 22, 23, 24 and 25. It should also be mentioned that the means 8, 19 and the stage 122 may be implemented by a software object. The same is true of the recognition means 18, 20, 21, 22, 23, 24 and 25. It should also be mentioned that the means 8, 18, 19, 20, 21, 22, 23, 24 and 25 may be implemented in the form of hardware The means 24 forms, in the embodiment described above, a so-called "large vocabulary continuous speech recognizer". It should however be mentioned that the means 24 may also form a so-called "command and control recognizer", in which case the context or topic comprises only a lexicon and no language model. Additional provisions are also made that allow at least one grammar model to be managed.

For the purposes of the means 23 and 24, provision may also be made for the items of information CHI, LI and SGI to be combined into so-called phoneme model information, because the three items of information determine the particular phoneme model even though the LI information is used independently of and in addition to the phoneme model information in the case of means 23. This gives the advantage that the architecture of the speech recognition device 1 is simplified.

A further provision that may be made is for additional provision to be made in the means 20 for so-called "hesitations" to be recognized.

The invention claimed is:

1. A system for providing transcription of a conference between a plurality of participants of the conference, the system comprising:
   a plurality of reception stages to receive information from the plurality of participants over a respective plurality of transmission channels; and
   at least one processor with programmed to receive the information from the plurality of reception stages, the at least one processor further programmed to:
      analyze the information received at the plurality of reception stages to determine which of the plurality of participants of the conference is speaking during a given time interval based, at least in part, on identifying which of the plurality of reception stages is receiving speech information;
      select one of the plurality of transmission channels corresponding to the reception stage identified as receiving speech information as an in-use channel;
      determine channel information including at least one transmission parameter of the in-use channel;
      extract at least one feature vector from the speech information based, at least in part, on the channel information;
      perform acoustic segmentation of the speech information to generate acoustic segmentation information indicating at least one segment identified in the speech information based, at least in part, on the channel information and the at least one feature vector, the acoustic segmentation information including a label for the at least one segment of the speech information indicating whether the at least one segment is associated with speech, a pause in speech or non-speech;
      determine a language of the speech information based, at least in part, on the channel information, the at least one feature vector and the acoustic segmentation information; and
      generate text information corresponding to words recognized in the speech information based, at least in part, on the channel information, the at least one feature vector, the acoustic segmentation information and the language.

2. The system of claim 1, wherein the plurality of reception stages include at least two of the following:
   at least one sound card installed in at least one computer, the sound card connected to at least one microphone;
   at least one connection adapted to receive at least one analog telephone line;
   at least one connection adapted to receive at least one digital telephone line;
   at least one connection adapted to receive at least one Integrated Services Digital Network (ISDN) telephone line;
   at least one connection adapted to receive at least one data network channel; and
   at least one connection adapted to receive a voice-over-internet-protocol (VoIP) data stream.

3. The system of claim 2, wherein the channel information includes bandwidth information of the in-use channel.

4. The system of claim 2, wherein the at least one processor is programmed to recognize at least one key word in the speech information based, at least in part, on the language of the speech information, and wherein a speech recognizer provides the text information based, at least in part, on the at least one key word.

5. The system of claim 4, wherein the at least one processor is programmed to recognize a speaker group associated with the speech information based, at least in part, on the channel information and the language of the speech information, and wherein the speech recognizer provides the text information based, at least in part, on the speaker group.

6. A method of providing transcription of a conference between a plurality of participants of the conference, the method comprising:
   receiving information over a plurality of transmission channels from the plurality of participants;
   using at least one processor to analyze the information received at the plurality of reception stages to determine which of the plurality of participants of the conference is speaking during a given time interval based, at least in part, on identifying which of the plurality of reception stages is receiving speech information;
   selecting one of the plurality of transmission channels corresponding to the reception stage identified as receiving speech information as an in-use channel;
   determining channel information including at least one transmission parameter that identifies the in-use channel;

extracting at least one feature vector from the speech information based, at least in part, on the channel information;

performing acoustic segmentation of the speech information to generate acoustic segmentation information indicating at least one segment identified in the speech information based, at least in part, on the channel information and the at least one feature vector, the acoustic segmentation information including a label for the at least one segment of the speech information indicating whether the at least one segment is associated with speech, a pause in speech or non-speech;

determining a language of the speech information based, at least in part, on the channel information, the at least one feature vector and the acoustic segmentation information; and generating text information corresponding to words recognized in the speech information based, at least in part, on the channel information, the at least one feature vector, the acoustic segmentation information and the language of the speech information.

7. The method of claim 6, wherein receiving speech information over a plurality of transmission channels includes receiving speech information via at least two of the following:
   at least one sound card installed in at least one computer, the sound card connected to at least one microphone;
   at least one analog telephone line;
   at least one digital telephone line;
   at least one Integrated Services Digital Network (ISDN) telephone line;
   at least one data network channel; and
   at least one voice-over-internet-protocol (VoIP) data stream.

8. The method of claim 7, wherein the channel information includes bandwidth information of the in-use channel.

9. The method of claim 6, further comprising recognizing at least one key word in the speech information based, at least in part, on the language of the speech information, and providing the text information is based, at least in part, on the at least one key word.

10. The method of claim 9, further comprising recognizing a speaker group associated with the speech information based, at least in part, on the channel information and the language of the speech information, and wherein providing the text information is based, at least in part, on the speaker group.

11. A computer readable storage device encoded with a plurality of instructions for execution on at least one processor, the plurality of instructions, when executed on the at least one processor, performing a method of providing transcription of a conference between a plurality of participants of the conference, the method comprising:
   receiving information over a plurality of transmission channels from the plurality of participants;
   analyzing the information received at the plurality of reception stages to determine which of the plurality of participants of the conference is speaking during a given time interval based, at least in part, on identifying which of the plurality of reception stages is receiving speech information;
   selecting one of the plurality of transmission channels corresponding to the reception stage identified as receiving speech information as an in-use channel;
   determining channel information including at least one transmission parameter that identifies the in-use channel;
   extracting at least one feature vector from the speech information based, at least in part, on the channel information;
   performing acoustic segmentation of the speech information to generate acoustic segmentation information indicating at least one segment identified in the speech information based, at least in part, on the channel information and the at least one feature vector, the acoustic segmentation information including a label for the at least one segment of the speech information indicating whether the at least one segment is associated with speech, a pause in speech or non-speech;
   determining a language of the speech information based, at least in part, on the channel information, the at least one feature vector and the acoustic segmentation information; and
   generating text information corresponding to words recognized in the speech information based, at least in part, on the channel information, the at least one feature vector, the acoustic segmentation information and the language of the speech information.

12. The computer readable storage device of claim 11, wherein receiving speech information over a plurality of transmission channels includes receiving speech information via at least two of the following:
   at least one sound card installed in at least one computer, the sound card connected to at least one microphone;
   at least one analog telephone line;
   at least one digital telephone line;
   at least one Integrated Services Digital Network (ISDN) telephone line;
   at least one data network channel; and
   at least one voice-over-internet-protocol (VoIP) data stream.

13. The computer readable storage device of claim 12, wherein the channel information includes bandwidth information of the in-use channel.

14. The computer readable storage device of claim 11, further comprising recognizing at least one key word in the speech information based, at least in part, on the language of the speech information, and providing the text information is based, at least in part, on the at least one key word.

15. The computer readable storage device of claim 14, further comprising recognizing a speaker group associated with the speech information based, at least in part, on the channel information and the language of the speech information, and wherein providing the text information is based, at least in part, on the speaker group.

* * * * *